US011218616B2

(12) United States Patent
Mizuno

(10) Patent No.: US 11,218,616 B2
(45) Date of Patent: Jan. 4, 2022

(54) IMAGE READING APPARATUS, CONTROL METHOD THEREOF, AND STORAGE MEDIUM STORING PROGRAM

(71) Applicant: CANON KABUSHIKI KAISHA, Tokyo (JP)

(72) Inventor: Yoshitake Mizuno, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/689,669

(22) Filed: Nov. 20, 2019

(65) Prior Publication Data

US 2020/0177761 A1 Jun. 4, 2020

(30) Foreign Application Priority Data

Nov. 30, 2018 (JP) .............................. JP2018-225479

(51) Int. Cl.
*H04N 1/32* (2006.01)
*H04N 1/00* (2006.01)

(52) U.S. Cl.
CPC ....... *H04N 1/3248* (2013.01); *H04N 1/00822* (2013.01); *H04N 2201/0094* (2013.01)

(58) Field of Classification Search
CPC ................................................... H04N 1/3248

USPC ........................................................ 358/1.13
See application file for complete search history.

(56) References Cited

FOREIGN PATENT DOCUMENTS

| JP | 2003-173109 A | 6/2003 |
|----|---------------|--------|
| JP | 2005-010733 A | 1/2005 |
| JP | 2008-278297 A | 11/2008 |
| JP | 2011-023999 A | 2/2011 |

*Primary Examiner* — Jacky X Zheng
(74) *Attorney, Agent, or Firm* — Canon U.S.A., Inc. I.P. Division

(57) ABSTRACT

An image reading apparatus to read a sheet being conveyed includes a memory and a reading device to read one side of the sheet in units of a line area orthogonal to a conveyance direction of the sheet. A read image of a first region corresponding to a leading edge side of the sheet in the conveyance direction is stored into the memory. A read image of a second region subsequent to the first region is not stored. A read image of a third region subsequent to the second region and corresponding to a trailing edge side of the sheet in the conveyance direction is stored in the memory. Each read image is an image read by the reading device. Predetermined processing is performed based on the read image of the first region and the read image of the third region stored in the memory.

17 Claims, 18 Drawing Sheets

FIG.5

| | SHEET NAME | WIDTH (mm) | LENGTH (mm) | GRAMMAGE (g/m²) | SURFACE PROPERTY | COLOR | PREPRINTED PAPER | AMOUNTS OF POSITION DEVIATION (FRONT) | AMOUNTS OF POSITION DEVIATION (BACK) |
|---|---|---|---|---|---|---|---|---|---|
| | | 512 | 513 | 514 | 515 | 516 | 517 | 518 | 519 |
| 501 | ABC PAPER MILL RECYCLED 1 | 210 | 297 | 75 | PLAIN PAPER | WHITE | NO | LEAD POSITION: 0.30 mm<br>SIDE POSITION: -0.1 mm<br>MAIN SCANNING MAGNIFICATION: +0.02%<br>SUB SCANNING MAGNIFICATION: +0.01% | LEAD POSITION: 0.20 mm<br>SIDE POSITION: 0.10 mm<br>MAIN SCANNING MAGNIFICATION: +0.02%<br>SUB SCANNING MAGNIFICATION: -0.03% |
| 502 | ABC PAPER MILL RECYCLED 2 | 297 | 420 | 75 | PLAIN PAPER | WHITE | NO | LEAD POSITION: 0.00 mm<br>SIDE POSITION: 0.00 mm<br>MAIN SCANNING MAGNIFICATION: +0.00%<br>SUB SCANNING MAGNIFICATION: +0.00% | LEAD POSITION: 0.00 mm<br>SIDE POSITION: 0.00 mm<br>MAIN SCANNING MAGNIFICATION: +0.00%<br>SUB SCANNING MAGNIFICATION: +0.00% |
| 503 | DEF PAPER MILL EMBOSSED PAPER A-1 | 216 | 279 | 170 | EMBOSSED | WHITE | NO | LEAD POSITION: 0.50 mm<br>SIDE POSITION: -0.30 mm<br>MAIN SCANNING MAGNIFICATION: +0.02%<br>SUB SCANNING MAGNIFICATION: +0.02% | LEAD POSITION: -0.30 mm<br>SIDE POSITION: 0.50 mm<br>MAIN SCANNING MAGNIFICATION: +0.01%<br>SUB SCANNING MAGNIFICATION: -0.03% |
| 504 | DEF PAPER MILL COATED PAPER P-1 | 279 | 432 | 128 | TWO-SIDED COATED | WHITE | NO | LEAD POSITION: 0.40 mm<br>SIDE POSITION: -0.20 mm<br>MAIN SCANNING MAGNIFICATION: +0.12%<br>SUB SCANNING MAGNIFICATION: +0.08% | LEAD POSITION: -0.20 mm<br>SIDE POSITION: 0.60 mm<br>MAIN SCANNING MAGNIFICATION: -0.02%<br>SUB SCANNING MAGNIFICATION: -0.01% |
| 505 | XYZ PAPER MILL COLOR 81 | 210 | 297 | 75 | PLAIN PAPER | ORANGE | NO | LEAD POSITION: 0.00 mm<br>SIDE POSITION: 0.00 mm<br>MAIN SCANNING MAGNIFICATION: +0.00%<br>SUB SCANNING MAGNIFICATION: +0.00% | LEAD POSITION: 0.00 mm<br>SIDE POSITION: 0.00 mm<br>MAIN SCANNING MAGNIFICATION: +0.00%<br>SUB SCANNING MAGNIFICATION: +0.00% |
| 506 | XYZ PAPER MILL COLOR 82 | 210 | 297 | 75 | PLAIN PAPER | PINK | NO | LEAD POSITION: 0.00 mm<br>SIDE POSITION: 0.00 mm<br>MAIN SCANNING MAGNIFICATION: +0.00%<br>SUB SCANNING MAGNIFICATION: +0.00% | LEAD POSITION: 0.00 mm<br>SIDE POSITION: 0.00 mm<br>MAIN SCANNING MAGNIFICATION: +0.00%<br>SUB SCANNING MAGNIFICATION: +0.00% |
| 507 | FGH PAPER MILL GRID 75 | 210 | 297 | 75 | PLAIN PAPER | WHITE | YES | LEAD POSITION: 0.00 mm<br>SIDE POSITION: 0.00 mm<br>MAIN SCANNING MAGNIFICATION: +0.00%<br>SUB SCANNING MAGNIFICATION: +0.00% | LEAD POSITION: 0.00 mm<br>SIDE POSITION: 0.00 mm<br>MAIN SCANNING MAGNIFICATION: +0.00%<br>SUB SCANNING MAGNIFICATION: +0.00% |
| 508 | FGH PAPER MILL PLAIN PAPER 2 | 210 | 297 | 75 | PLAIN PAPER | WHITE | NO | LEAD POSITION: -0.03 mm<br>SIDE POSITION: -0.07 mm<br>MAIN SCANNING MAGNIFICATION: +0.06%<br>SUB SCANNING MAGNIFICATION: -0.01% | LEAD POSITION: -0.03 mm<br>SIDE POSITION: -0.10 mm<br>MAIN SCANNING MAGNIFICATION: +0.04%<br>SUB SCANNING MAGNIFICATION: +0.02% |

FIG.6

| | MEASUREMENT VALUE | IDEAL VALUE | AMOUNT OF POSITION DEVIATION |
|---|---|---|---|
| LEAD POSITION (FRONT) | (D + H) / 2 | 10.0 mm | MEASUREMENT VALUE − IDEAL VALUE |
| SIDE POSITION (FRONT) | C | 10.0 mm | MEASUREMENT VALUE − IDEAL VALUE |
| MAIN SCANNING MAGNIFICATION (FRONT) | (SHEET LENGTH A IN MAIN SCANNING DIRECTION) − (C + G) | SHEET LENGTH A IN MAIN SCANNING DIRECTION − 20 mm | (MEASUREMENT VALUE − IDEAL VALUE) / 2 |
| SUB SCANNING MAGNIFICATION (FRONT) | (SHEET LENGTH B IN SUB SCANNING DIRECTION) − (D + H + F + J) / 2 | SHEET LENGTH B IN SUB SCANNING DIRECTION − 20 mm | (MEASUREMENT VALUE − IDEAL VALUE) / 2 |
| LEAD POSITION (BACK) | (D' + H') / 2 | 10.0 mm | MEASUREMENT VALUE − IDEAL VALUE |
| SIDE POSITION (BACK) | C' | 10.0 mm | MEASUREMENT VALUE − IDEAL VALUE |
| MAIN SCANNING MAGNIFICATION (BACK) | (SHEET LENGTH A IN MAIN SCANNING DIRECTION) − (C' + G') | SHEET LENGTH A IN MAIN SCANNING DIRECTION − 20 mm | (MEASUREMENT VALUE − IDEAL VALUE) / 2 |
| SUB SCANNING MAGNIFICATION (BACK) | (SHEET LENGTH B IN SUB SCANNING DIRECTION) − (D' + H' + F' + J') / 2 | SHEET LENGTH B IN SUB SCANNING DIRECTION − 20 mm | (MEASUREMENT VALUE − IDEAL VALUE) / 2 |
| DEGREE OF SQUARENESS (FRONT) | (D − H) / {(SHEET LENGTH A IN MAIN SCANNING DIRECTION) − 20} | 0.00 mm | MEASUREMENT VALUE − IDEAL VALUE |
| DEGREE OF SQUARENESS (BACK) | (D' − H') / {(SHEET LENGTH A IN MAIN SCANNING DIRECTION) − 20} | 0.00 mm | MEASUREMENT VALUE − IDEAL VALUE |

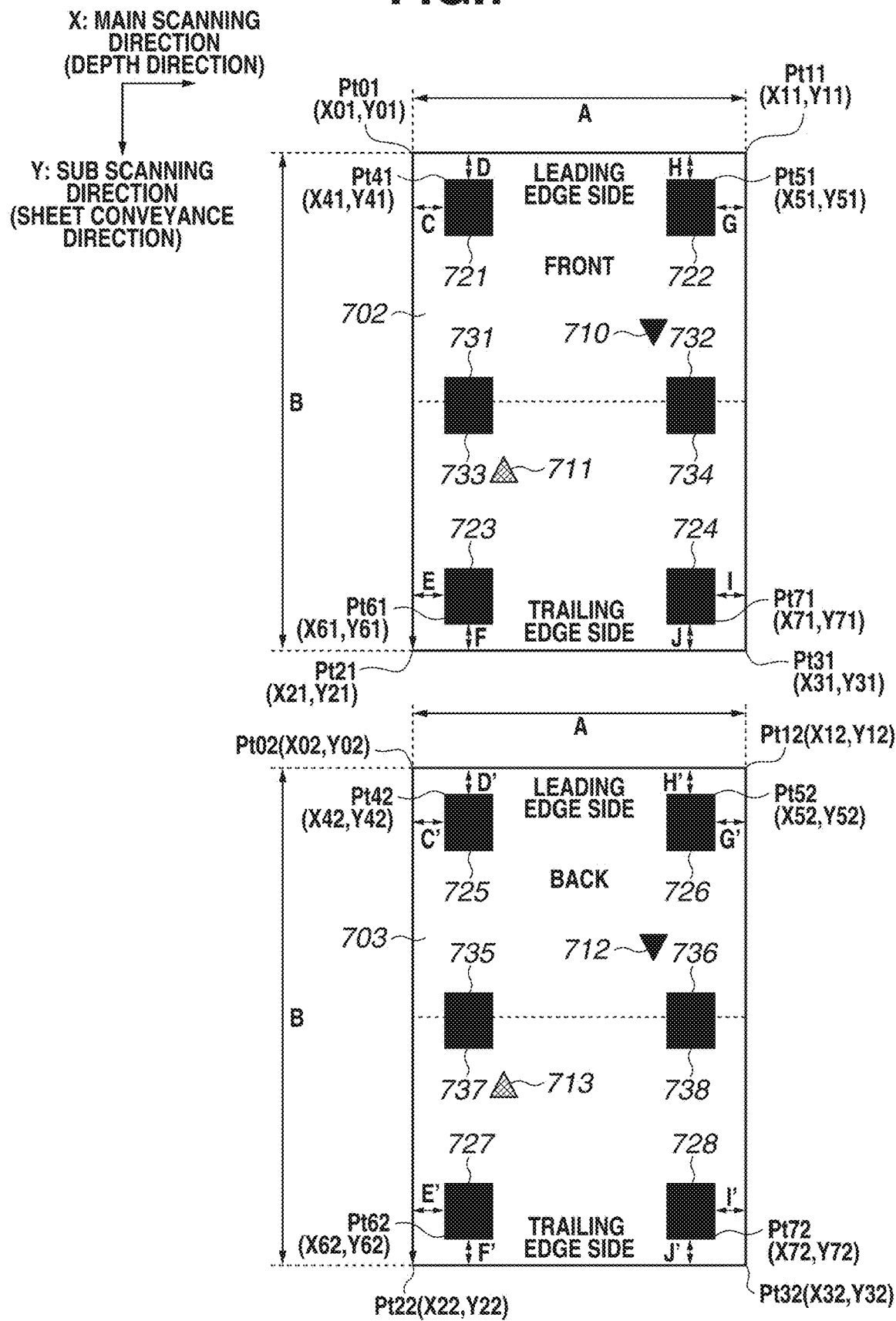

FIG.8A
800

SHEET SELECTION 811　　　　　　　　　　　　　　　　　　　　　　813

| SHEET NAME | SUB SCANNING SHEET LENGTH (mm) | MAIN SCANNING SHEET LENGTH (mm) | GRAMMAGE (g/m$^2$) | SURFACE PROPERTY | COLOR | SUB SCANNING MOVING AMOUNT (mm) | SUB SCANNING MOVING AMOUNT (mm) |
|---|---|---|---|---|---|---|---|
| ABC PAPER MILL RECYCLED 1 | 210 | 297 | 75 | PLAIN PAPER | WHITE | +0.1 | -0.1 |
| ABC PAPER MILL RECYCLED 2 | 297 | 420 | 75 | PLAIN PAPER | WHITE | 0 | 0 |
| DEF PAPER MILL EMBOSSED PAPER A-1 | 216 | 279 | 150 | EMBOSSED | WHITE | -0.2 | +0.3 |
| DEF PAPER MILL COATED PAPER P-1 | 279 | 432 | 128 | TWO-SIDED COATED | WHITE | 0 | 0 |
| XYZ PAPER MILL COLOR 81 | 210 | 297 | 75 | PLAIN PAPER | ORANGE | 0 | 0 |
| XYZ PAPER MILL COLOR 82 | 210 | 297 | 75 | PLAIN PAPER | PINK | 0 | 0 |

820　　　　821　　　　822　　　　823　　812

| NEW ENTRY | EDIT | DELETE | ADJUST PRINT POSITION |

FIG.8B
850

< POSITION ADJUSTMENT: SELECT CORRECTION METHOD >

851 — MANUAL ADJUSTMENT

852 — AUTOMATIC ADJUSTMENT

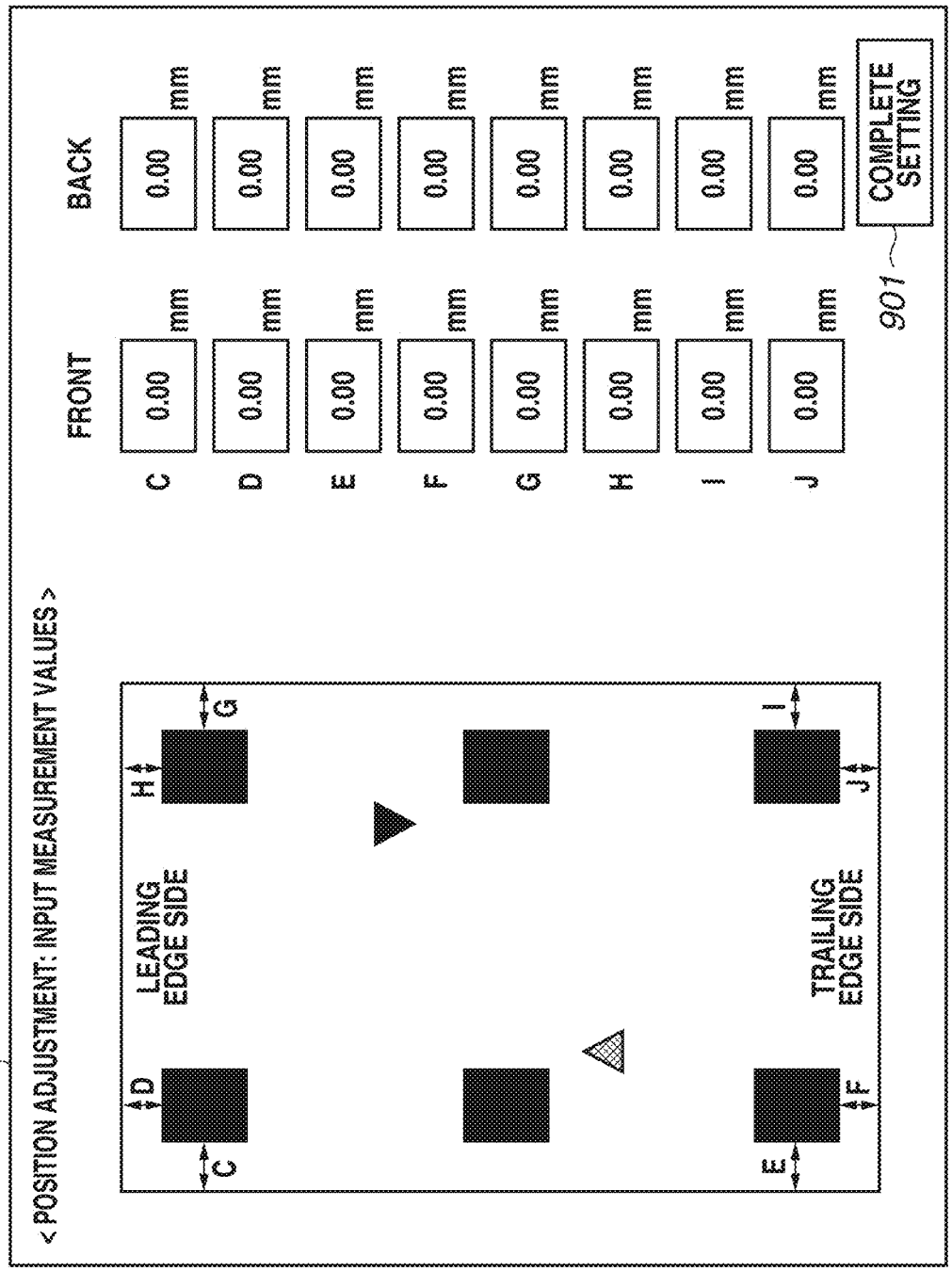

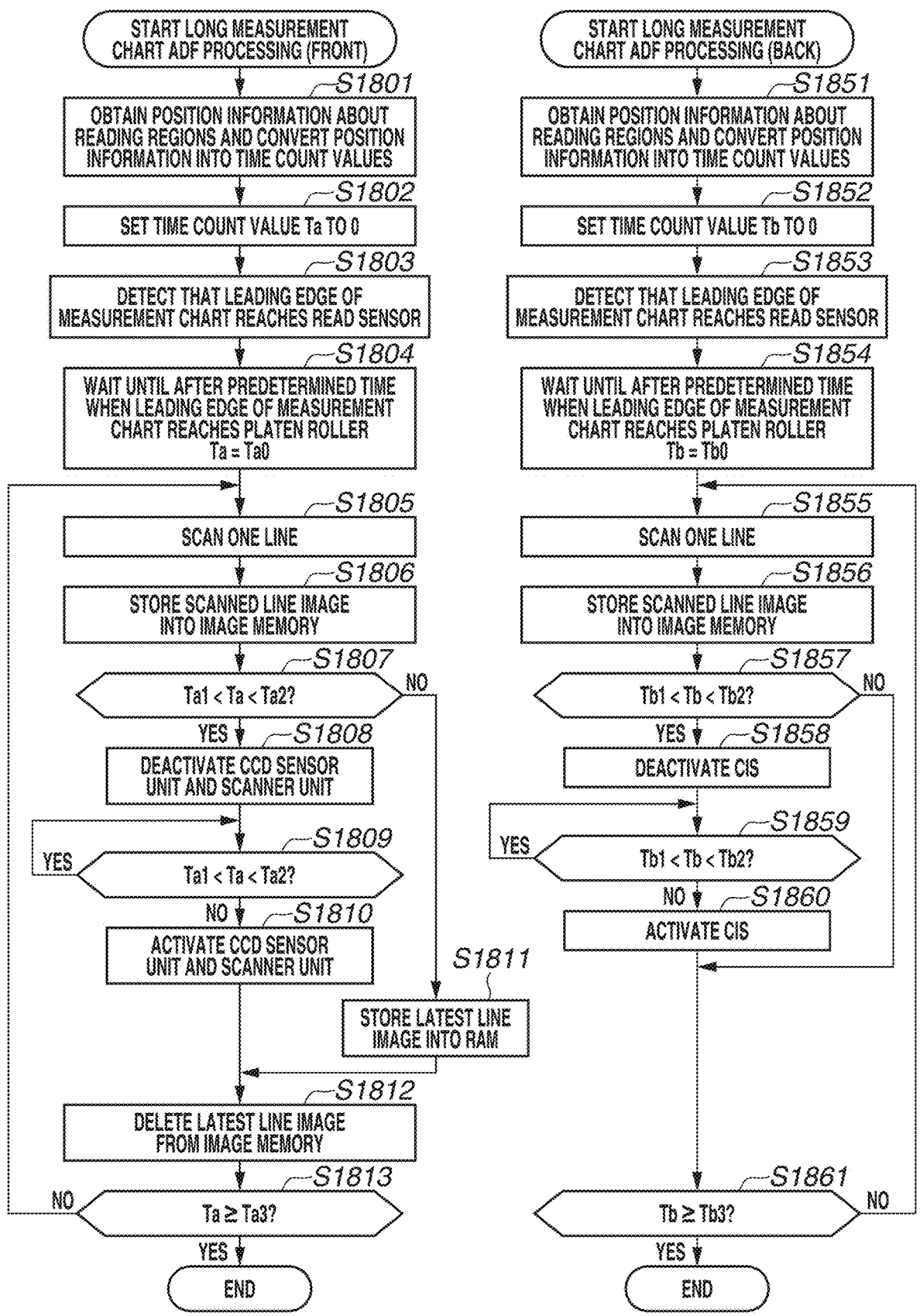

IMAGE READING APPARATUS, CONTROL METHOD THEREOF, AND STORAGE MEDIUM STORING PROGRAM

BACKGROUND

Field

The present disclosure relates to an image reading apparatus such as a copying machine and a multifunctional peripheral, and more particularly to an image reading apparatus having a function of adjusting an image forming position on a sheet.

Description of the Related Art

In forming an image on a sheet, the image can sometimes be formed at a position deviated from an ideal forming position. Such a deviation will be referred to as a "position deviation". Japanese Patent Application Laid-Open No. 2003-173109 discusses an image forming apparatus that forms marks (reference images) at predetermined positions on both sides of a sheet, reads the marks by an image reading apparatus, measures distances from sheet edges to the marks based on the reading result, and adjusts image forming positions based on the measured distances.

If adjustment information about the image forming positions is obtained by analyzing images read from a sheet as discussed in Japanese Patent Application Laid-Open No. 2003-173109, read image data of high image quality may be desirable to obtain high-precision adjustment information. Such read image data is desirably read at high resolution and recorded in a storage device, such as a dynamic random access memory (DRAM), in an uncompressed state or in a low-compressed state, such as a state in which the image data is lowly compressed by lossless compression.

High resolution, uncompressed or low-compressed image data tends to have a large data size. The image data is likely to have a large size particularly if a large-sized sheet (recording medium) is read or both sides of a sheet are read. From such reasons, the image reading apparatus may desirably have a high-capacity storage area for storing image data having a large data size. For example, to record uncompressed image data on both sides of an A3-sized sheet at 600 dpi in a red-green-blue (RGB) color space with 8-bit-per-color pixels, a storage area of approximately 3.1 gigabit (Gbits) may be desirable. Even greater storage areas may be desirable for long sheets.

However, such a huge storage area is difficult to secure in a case where the storage area needs to be instantaneously secured, like when two-sided simultaneous reading is performed by using an automatic conveyance device (automatic document feeder (ADF)).

SUMMARY

The present disclosure is directed to providing an image reading apparatus that reads a sheet being conveyed and stores an image used for predetermined processing with high image quality.

According to an aspect of the present disclosure, an image reading apparatus configured to read a sheet being conveyed includes a reading device configured to read one side of the sheet in units of a line area orthogonal to a conveyance direction of the sheet, one or more processors, and a memory storing instructions that, when executed by the one or more processors, cause the image reading apparatus to perform operations including: storing, into the memory, a read image of a first region corresponding to a leading edge side of the sheet in the conveyance direction, not storing a read image of a second region subsequent to the first region, and storing, into the memory, a read image of a third region subsequent to the second region and corresponding to a trailing edge side of the sheet in the conveyance direction, wherein each read image is an image read by the reading device, and performing predetermined processing based on the read image of the first region and the read image of the third region stored in the memory.

Further features of the present disclosure will become apparent from the following description of exemplary embodiments with reference to the attached drawings.

BRIEF DESCRIPTION OF THE DRAWINGS

FIG. 5 is a diagram illustrating information managed by a sheet management table.

FIG. 6 is a diagram illustrating information managed by a calculation table.

FIG. 7 is a diagram illustrating a configuration of a measurement chart.

FIG. 8A is a diagram illustrating a sheet management table editing screen. FIG. 8B is a diagram illustrating a selection screen.

FIG. 9 is a diagram illustrating an input screen for inputting manual measurements.

FIG. 18 is a flowchart illustrating a procedure of long measurement chart ADF reading processing according to the second exemplary embodiment.

DESCRIPTION OF THE EMBODIMENTS

Exemplary embodiments for carrying out the present disclosure will be described in detail below with reference to the drawings. Note that the scope of the present disclosure is not limited to the configurations described in the exemplary embodiments. Part of the configurations according to the exemplary embodiments may be omitted and part or all of the configurations may be replaced with equivalents as far as effective.

A first exemplary embodiment will be described below. The first exemplary embodiment deals with a system that reads a measurement chart printed on both sides of a long sheet by using an automatic conveyance device (automatic document feeder (ADF)). In particular, the present exemplary embodiment is characterized in storing the images of a leading edge region (region on a leading edge side in a sheet conveyance direction) and a trailing edge region (region on a trailing edge side in the sheet conveyance direction) of a long measurement chart used to calculate adjustment values with high image quality by immediately discarding an image read from an intermediate region in the conveyance direction of the long sheet.

<Use Case>

Figure 15:
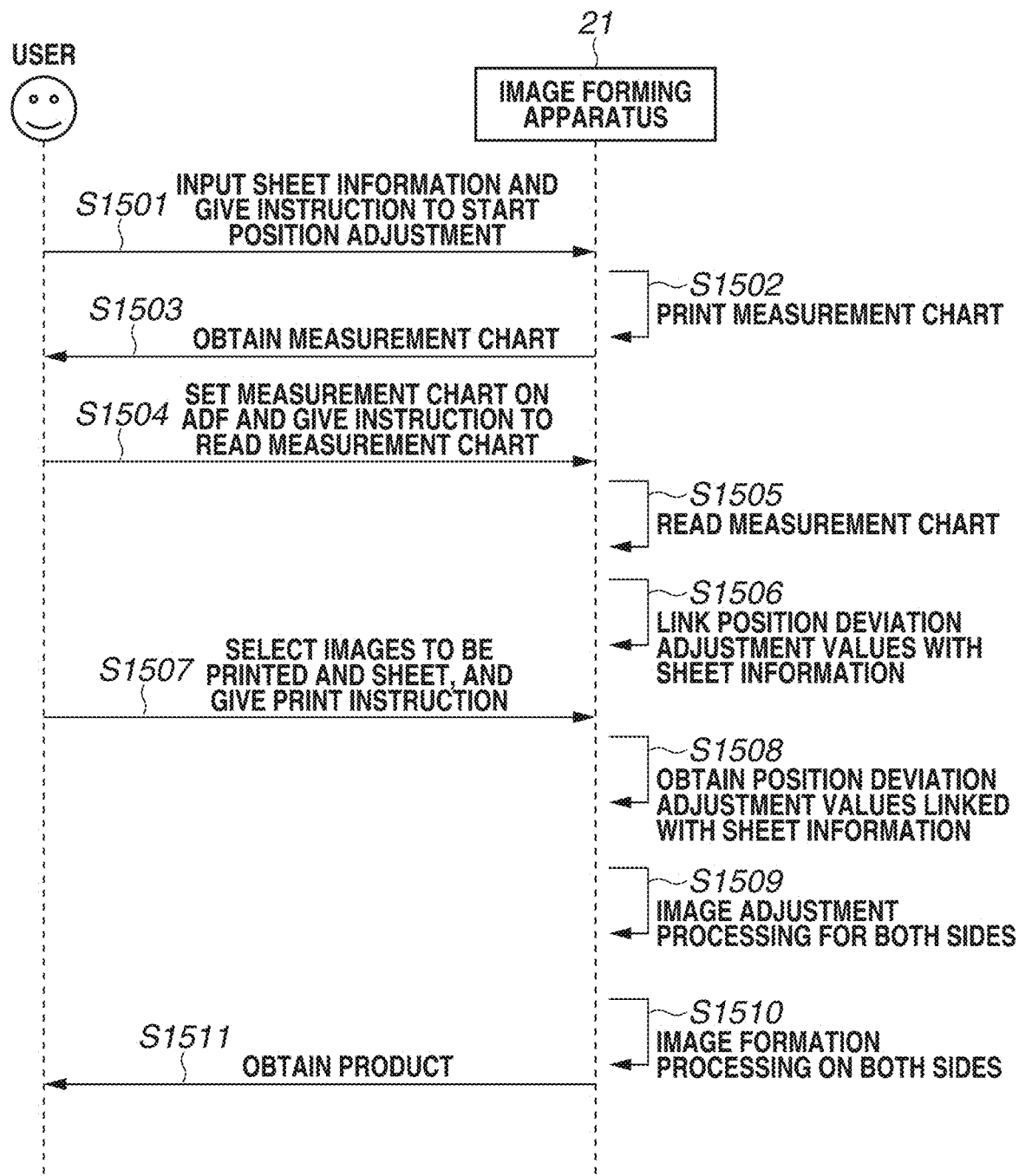
FIG. 15 is a diagram illustrating a use case of the present system.

The present system is implemented by an image forming apparatus 21 having a function as an image reading apparatus. FIG. 15 is a diagram illustrating a use case of the present system.

In using the present system, in step S1501, the user initially inputs sheet information about a type of sheet to make a position adjustment to into the image forming apparatus 21, and gives an instruction to start the position adjustment. In step S1502, the image forming apparatus 21 receiving the instruction from the user performs processing for printing a measurement chart by using a set sheet. The measurement chart includes marks formed on both sides of the sheet.

In step S1503, the user obtains the sheet on which the measurement chart is printed. In step S1504, the user sets the sheet on the ADF of the image forming apparatus 21, and gives an instruction to read the measurement chart. In step S1505, the image forming apparatus 21 receiving the instruction from the user obtains read images while conveying the sheet by using the ADF. In the present exemplary embodiment, processing for obtaining only the images of the regions used to calculate adjustment values at high resolution is performed in this step S1505. In step S1506, the image forming apparatus 21 obtaining the read images of the measurement chart calculates position deviation adjustment values (hereinafter, may be referred to as "adjustment values") based on the read images, and links the position deviation adjustment values with the sheet information. In step S1507, the user selects images to be printed and a sheet having sheet information with which position deviation adjustment values are linked, and gives a print instruction. In step S1508, the image forming apparatus 21 receiving the print instruction obtains the position deviation adjustment values linked with the sheet information, in step S1509, the image forming apparatus 21 performs image adjustment processing for both sides based on the obtained position deviation adjustment values. After the adjustment processing, then in step S1510, the image forming apparatus 21 performs image formation processing on both sides of the sheet based on the adjusted images. Through the foregoing procedure, in step S1511, the user using the system can obtain a product of which image position deviations are corrected.

<Configuration of Image Forming Apparatus>

Figure 1:
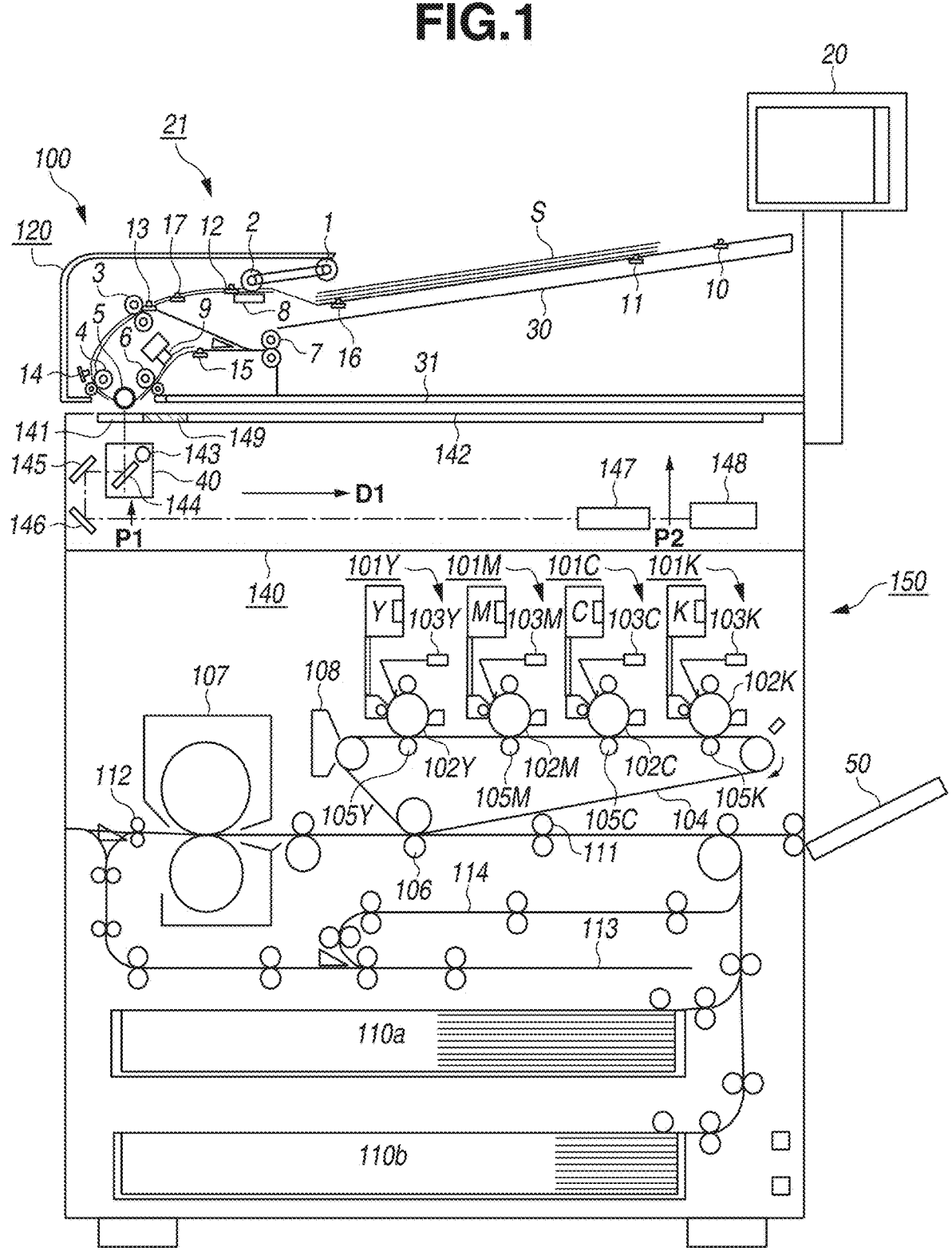
FIG. 1 is a diagram illustrating a configuration of an image forming apparatus.
Figure 2A:
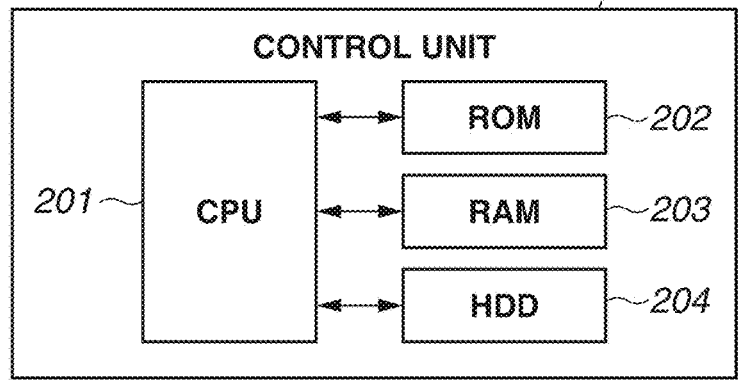
FIG. 2A is a diagram illustrating a hardware configuration of a control unit.
Figure 2B:
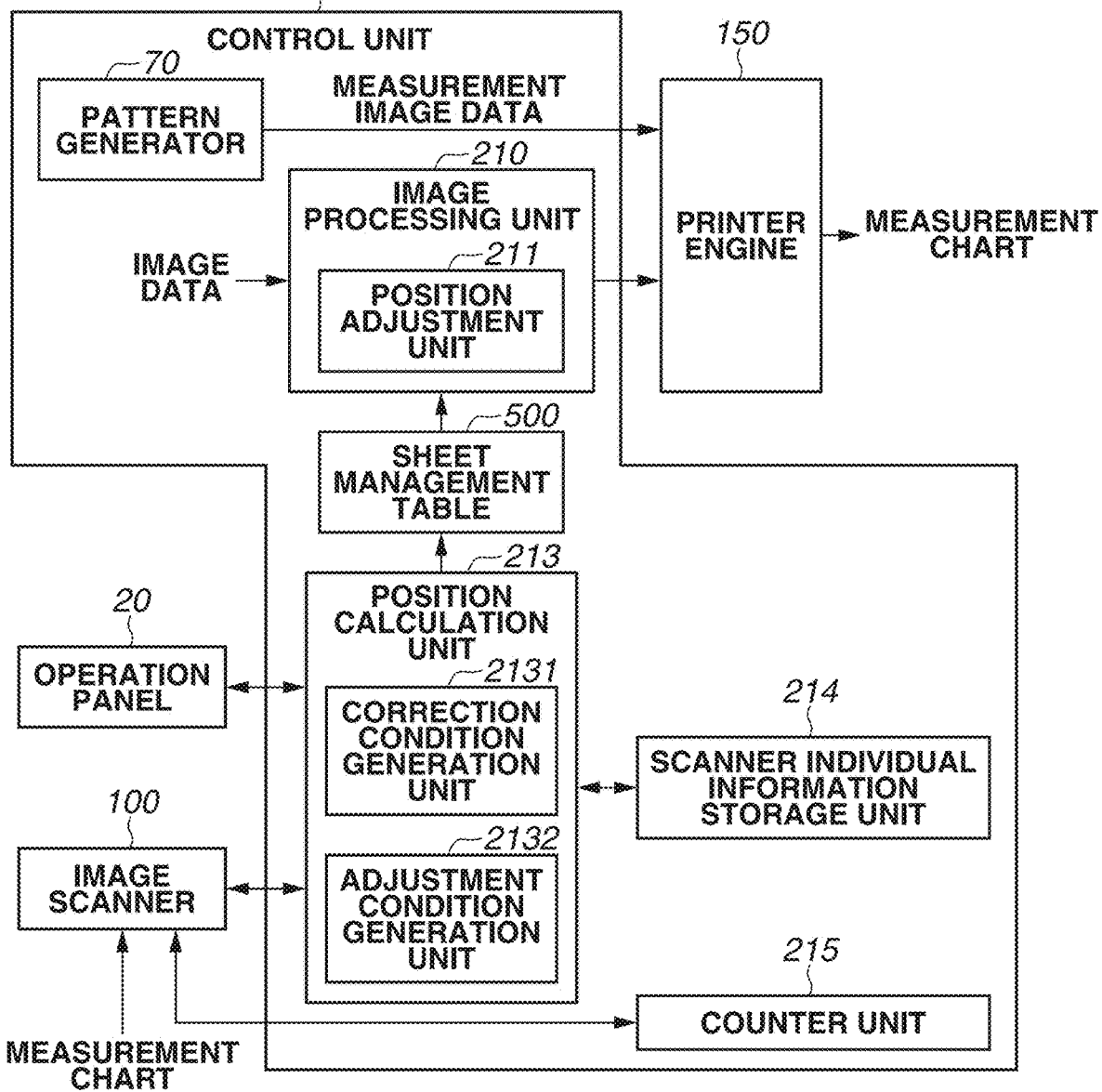
FIG. 2B is a diagram illustrating a logical configuration of the control unit.
Figure 3:
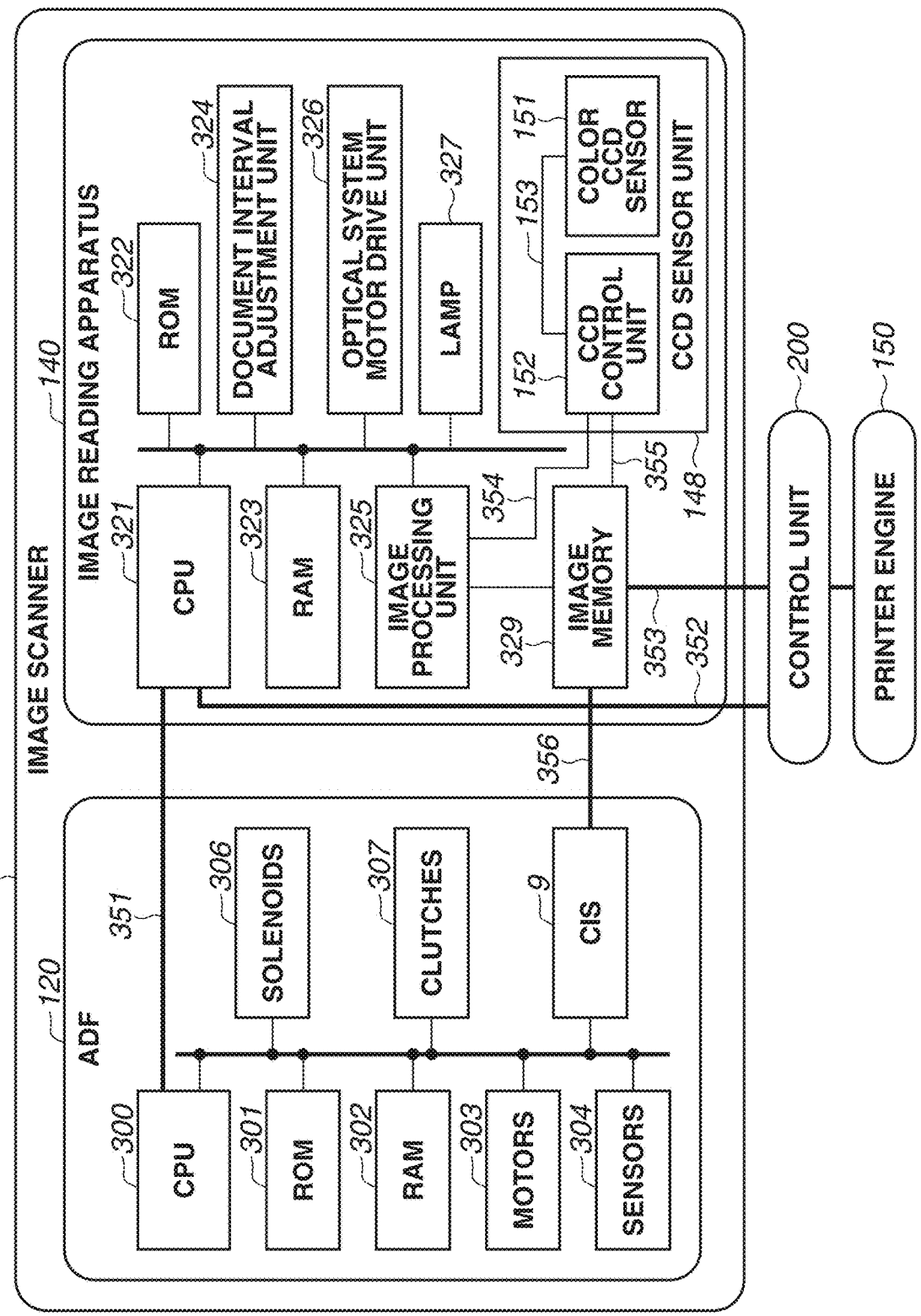
FIG. 3 is a diagram illustrating a relationship between components of the image forming apparatus.
Figure 4A:
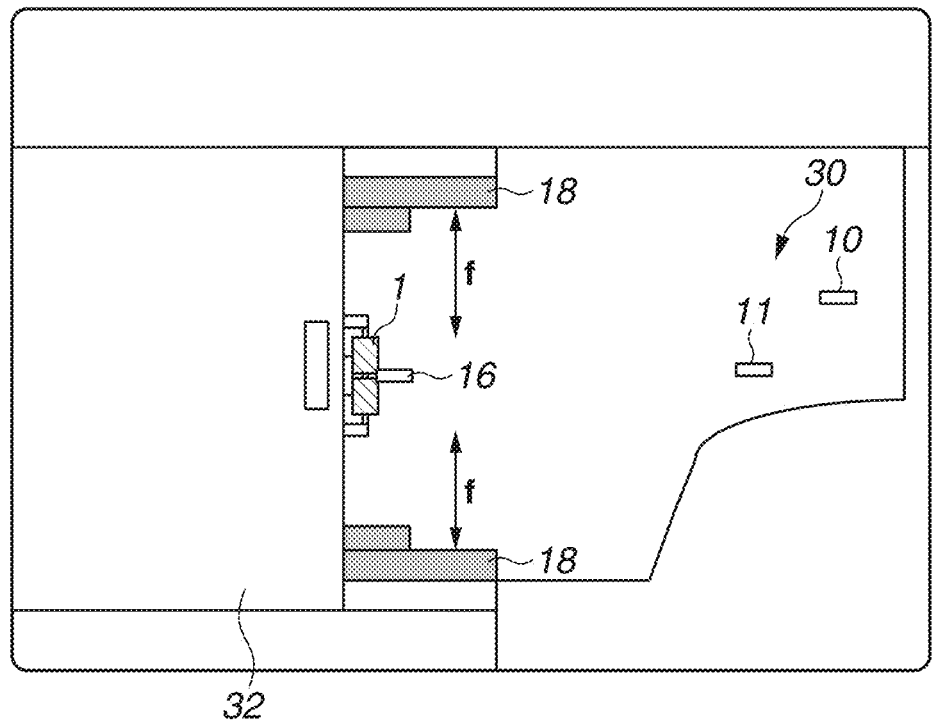
FIG. 4A is a plan view illustrating a configuration of a document tray.
Figure 4B:
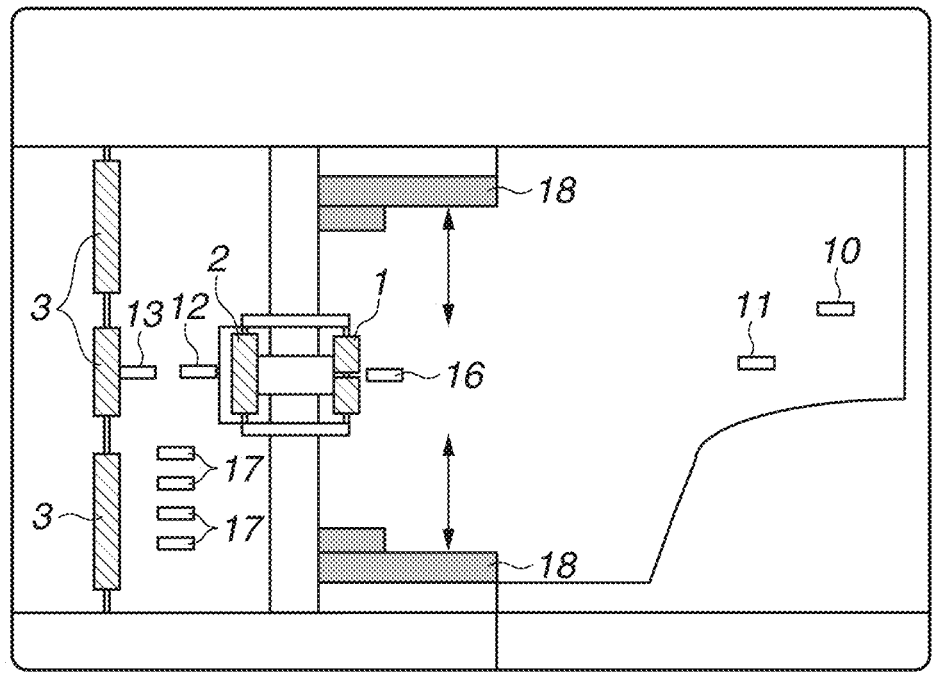
FIG. 4B is a diagram illustrating the configuration of the document tray in a see-through manner.

The present system is implemented by the image forming apparatus 21. FIG. 1 is a diagram illustrating a configuration of the image forming apparatus 21. FIG. 2A is a diagram illustrating a hardware configuration of a control unit. FIG. 2B is a diagram illustrating a logical configuration of the control unit. FIG. 3 is a diagram illustrating a relationship between components of the image forming apparatus 21. FIG. 4A is a plan view illustrating a configuration of a document tray 30. FIG. 4B is a diagram illustrating the configuration of the document tray 30 in a see-through manner. As illustrated in FIG. 3, the image forming apparatus 21 is an information processing apparatus including an ADF 120 (automatic document feeding apparatus 120), an image reading apparatus 140, a control unit 200, and a printer engine 150. The image forming apparatus 21 is called a multifunction peripheral (MFP). Each unit includes a central processing unit (CPU) functioning as a controller, a read-only memory (ROM), and a random access memory (RAM). The controllers communicate with each other for cooperative control.

FIG. 1 is a diagram illustrating the configuration of the image forming apparatus 21. The image forming apparatus 21 includes the printer engine 150, an image scanner 100, and an operation panel 20. The printer engine 150 is a printing device that forms an image on a sheet. The printer engine 150 will be described to form a multicolor image, whereas the printer engine 150 may form a monochrome image instead. The image scanner 100 functions as a reading unit that reads an image formed on a sheet and a measurement unit that measures an image forming position on the sheet based on the read image (reading device). The operation panel 20 is a user interface. The operation panel 20 includes input units such as various operations buttons and a touch panel sensor, and a display unit such as a display. If an instruction to copy an image on a document is given from the operation panel 20, the image forming apparatus 21 starts to read the image from the document by using the image scanner 100.

<Image Scanner>

The image scanner 100 has a function of generating image data expressing a read document image. The generated image data is stored in a hard disk drive (HDD) 204, transmitted to an external apparatus via a facsimile (FAX) line (not illustrated) or network line (not illustrated), or transmitted to the printer engine 150 for image formation processing.

The image scanner 100 includes the image reading apparatus (reader) 140 and the automatic document feeding apparatus (ADF) 120. FIG. 1 illustrates a state immediately after documents S are set on the document tray 30.

The image reading apparatus 140 includes a scantier unit 40, reflecting mirrors 145 and 146, a lens 147, and a charge-coupled device (CCD) sensor unit 148. The scanner unit 40 includes a light source lamp 143 and a reflecting mirror 144. Image information read by the CCD sensor unit 148 is photoelectrically converted and input to the control unit 200 (see FIGS. 2 and 3) as image data.

The scanner unit 40 is a configuration for reading an image from a document placed on a platen. An example of the scanner unit 40 is an optical sensor. The scanner unit 40 irradiates the document with light and reads a document image by using the resulting reflected light. In the present exemplary embodiment, the scanner unit 40 is used for both platen document reading processing and ADF reading processing.

In the platen document reading processing, the scanner unit 40 can read a document image on the entire document placed on a platen glass 142 by moving from a home position P1 to an end position P2 in the direction of the arrow D1.

In the ADF reading processing, the scanner unit 40 can read a document image on an entire document conveyed from the document tray 30 while standing in a document reading position under a document feed-scan platen glass 141.

FIG. 3 is a diagram illustrating the relationship between the components of the image forming apparatus 21. The ADF 120 includes a control unit (hereinafter referred to as "CPU") 300, a ROM 301, a RAM 302, output ports, and input ports.

The ROM 301 stores a control program. The RAM 302 stores input data and working data. Motors 303, solenoids 306, and clutches 307 for driving various conveyance rollers are connected to the output ports. Various sensors 304 are connected to the input ports. Examples of the various sensors 304 include a post-separation sensor 12, a discharge sensor 13, a discharge sensor 15, and document width detection sensors 17.

The CPU 300 controls conveyance of a document based on the control program stored in the ROM 301 connected via a bus line. The CPU 300 performs serial communication with a CPU 321 in the image reading apparatus (reader) 140 via a control communication line 351, and transmits and receives control data to/from the image reading apparatus 140. An image leading edge signal serving as a reference for the beginning of document image data is also notified to the image reading apparatus 140 via the control communication line 351. As to the back of a document, a contact image sensor (CIS) 9 is directly connected to an image memory 329 of the image reading apparatus 140 via an image signal line 356, and writes image data to the image memory 329. The image memory 329 is a buffer memory for temporarily storing read images in the image scanner 100.

The CPU 321 in the image reading apparatus 140 controls the image reading apparatus 140. A ROM 322 storing a program and a RAM 323 serving as a work memory are connected to the CPU 321. An optical system motor drive unit 326 is a driver circuit for driving an optical system driving motor, The image reading apparatus 140 includes a lamp 327 (light source lamp 143) and the CCD sensor unit 148. The CCD sensor unit 148 includes a color CCD sensor 151 and a CCD control unit 152. The CPU 321 performs image reading processing by controlling the optical system motor drive unit 326 and by controlling the CCD sensor unit 148 via an image processing unit 325.

To perform document conveyance, the CPU 321 transmits a sheet conveyance control command to the CPU 300, which is provided for sheet conveyance control, of the ADF 120 via the control communication line (communication line) 351. Receiving the sheet conveyance control command, the CPU 300 monitors the various sensors 304 installed on conveyance paths and drives loads, i.e., the conveyance motors 303, solenoids 306, and clutches 307 for sheet conveyance control.

In such a manner, the CPU 321 performs a document conveyance control on the ADF 120 and an image reading control on the image reading apparatus 140.

A document interval adjustment processing unit 324 corrects a conveyance interval between a preceding document and a subsequent document (distance between the preceding and subsequent documents). A document's reflected light image formed on the CCD sensor unit 148 via the lens 147 is converted into digital image data. The image processing unit 325 further applies various types of image processing to the converted digital image data. Examples of the various types of image processing include shading adjustment processing and unnecessary image removal processing for detecting and removing streak images from the image data.

The image data to which the various types of image processing are applied is written to the image memory 329.

The image data written to the image memory 329 is sequentially transmitted to the control unit 200 via a controller interface image communication line 353 including an image transfer clock signal line.

The image leading edge signal serving as the reference for the beginning of document image data is adjusted in timing by the CPU 321 and notified to the control unit 200 via a controller interface control communication line 352. The image leading edge signal notified from the ADF 120 via the control communication line 351 is similarly adjusted in timing by the CPU 321 in the image reading apparatus 140 and notified to the control unit 200 via the controller interface control communication line 352.

The CPU 321 controls the image processing unit 325 connected to a control bus line. The CPU 321 transmits a control signal to the CCD sensor unit 148 via the image processing unit 325 and a control communication line 354, and thereby controls the CCD sensor unit 148.

In the process of scanning a document image, the CCD sensor unit 148 outputs an analog image signal to the CCD control unit 152 via a communication line 153 each time the color CCD sensor 151 reads a line (in units of a line area). The direction in which the CCD sensor unit 148 reads a line (reading direction) is orthogonal to the sheet conveyance direction.

The CCD control unit 152 converts the analog image signal into digital image data. The digital image data is transmitted to the control unit 200 via an image data information communication line 355 including an image transfer clock signal line and the image memory 329.

During back scanning, the CIS 9 in the automatic document feeding apparatus 120 writes a digital image signal to the image memory 329 via the image signal line 356 line by line (in units of a line area). The reading line direction of the CIS 9 is orthogonal to the sheet conveyance direction.

After application of image processing such as magnification and rotation by a position adjustment unit 211 in an image processing unit 210, the image signal (image data) is written to a RAM 203. The image data to which the foregoing various types of processing are applied is handled as a read image of the document. If a scan-and-save function is used, the image data written to the RAM 203 is stored in the HDD 204. If a print instruction is given, the image data in the RAM 203 is transmitted to the printer engine 150 and printing is executed.

Next, a document image reading operation using the ADF 120 will be described. If a document image reading job is started using the ADF 120, the scanner unit 40 moves to a position directly below a reference white plate 149 and performs a shading operation. In the shading operation, the scanner unit 40 reads the reference white plate 149 to generate white level reference data. After the shading operation, the scanner unit 40 moves to a position directly below the document feed-scan platen glass 141 and waits until the document reaches a reading position.

The ADF 120 has a document size detection function. If a document is placed, the ADF 120 detects a size of the document from among regular sizes such as A and B standard sizes and inch standard sizes. FIGS. 4A and 4B are diagrams illustrating various sensors on the document tray 30. Guide regulation plates 18 slidable in the width direction of a stacked document bundle S are arranged on the document tray 30 in the width direction orthogonal to the conveyance direction of the documents. A guide regulation plate document width detection sensor (not illustrated) is provided to detect the length of the documents in the width direction (document width) in association with the guide regulation plates 18. When the user sets documents on the ADF 120, the guide regulation plates 18 are manually operated to sandwich and firmly hold the documents from both ends in the width direction to prevent the set documents from skewing.

If all the documents included in the document bundle S have the same size, the document size of the document bundle S stacked on the document tray 30 is determined in the following manner. The document size of the document bundle S can be determined from document width information obtained from the guide regulation plate document width detection sensor and document conveyance direction length information detectable by tray sensors 10 and 11 on the document tray 30.

The ADF 120 according to the present exemplary embodiment has a relatively short document conveyance path. Specifically, the conveyance distance from the post-separation sensor 12 to the document reading position is smaller than a predetermined distance. More specifically, the conveyance distance is smaller than the length of the short side (210 mm) of A4-size sheets that are the most frequently used. By measuring the clock of the conveyance motor during document conveyance, the length of the document in the conveyance direction is therefore unable to be determined before the document reaches the document reading position. In handling a long document having long sides in the conveyance direction, the user may input information about the length of the document in the conveyance direction by using the operation panel 20.

If a read job is started, the ADF 120 initially lowers a feed roller 1 to the document surface of the document bundle S including a plurality of documents, and starts to rotate the feed roller 1. The topmost document in the document bundle S is thereby fed out.

In feeding and conveying the topmost document one by one from the document tray 30 on which the document bundle S is stacked, the ADF 120 feeds and conveys the document by using a separation roller 2, a separation pad 8, and the feed roller 1. The separation roller 2 and the separation pad 8 prevent documents other than the topmost one from being conveyed out of the document bundle S in an overlapping manner with the topmost document.

Documents fed and conveyed by the feed roller 1 are separated one by one by the action of the separation roller 2 and the separation pad 8. Such separation is implemented by a conventional separation technique.

The document separated by the separation roller 2 and the separation pad 8 is conveyed to and abutted against registration rollers 3. This forms a loop on the leading edge side of the document to remove skew due to the conveyance of the document. A document pre-reading roller 4 is located downstream of the registration rollers 3. There is provided a feed path for conveying the document toward the document feed-scan platen glass 141 by the document pre-reading roller 4.

The document delivered to the feed path is then conveyed to the document pre-reading roller 4 by the registration rollers 3. The document is further conveyed to pass the document pre-reading roller 4 and pass the document reading position on the document feed-scan platen glass 141 near a document reading platen roller (platen roller) 5.

When a document is conveyed to the document reading position on the document feed-scan platen glass 141, a read sensor 14 detects the leading edge of the document to detect a document reading leading-edge position. The ADF 120 counts the time (for example, timing Ta0) from the timing when the read sensor 14 is on to when the document reaches the document reading position on the document feed-scan platen glass 141 (position of the platen roller 5) based on the clock of the conveyance motor (not illustrated) serving as the driving source of the document pre-reading roller 4 and the document reading platen roller 5.

In such a manner, the ADF 120 predicts the timing (document leading edge arrival timing) when the leading edge of the document arrives at the document reading position on the document feed-scan platen glass 141. The scanner unit 40 performs feed-scan image capturing on the front of the document based on the predicted document leading edge arrival timing. The ADF 120 also predicts the timing (document leading edge arrival timing; for example, timing Tb0) when the leading edge of the document arrives at the CIS 9 for back reading. The CIS 9 performs feed-scan image capturing on the back of the document based on the predicted document leading edge arrival timing.

When the trailing edge of the document is detected by the post-separation sensor 12, the ADF 120 detects the presence or absence of the next document on the document tray 30 by a document presence/absence detection sensor 16. If the trailing edge of the document passes the document reading platen roller 5 and a roller 6 and is further conveyed, the trailing edge of the document is detected by the discharge sensor 15 (document trailing edge detection timing). Triggered by the document trailing edge detection timing detected by the discharge sensor 15, the document is further discharged to a document discharge tray 31 by a discharge roller 7. This completes a two-sided document reading and conveyance sequence for a single document.

The ADF 120 basically repeats the feeding of a document, the capturing of document images, and the discharge of the document as described above until there is no document on the document tray 30, unless a set number of documents are read based on a job setting. If the trailing edge of a document is detected by the post-separation sensor 12 and no document is detected on the document tray 30, the ADF 120 determines that the document being conveyed is the last one, and waits for the last document to be discharged to the document discharge tray 31. If the last document is discharged to the document discharge tray 31, the ADF 120 stops the conveyance motors serving as the driving sources of the rollers, and restores the feed roller 1 to the original position. The document reading job is ended.

<Printer Engine 150>

The printer engine 150 includes a plurality of image forming units 101Y, 101M, 101C, and 101K. The image forming units 101Y, 101M, 101C, and 101K form toner images by using toner of respectively different colors. The image forming unit 101Y forms a yellow (Y) toner image. The image forming unit 101M forms a magenta (M) toner image. The image forming unit 101C forms a cyan (C) toner image. The image forming unit 101K forms a black (K) toner image. The symbols Y, M, C, and K after the respective reference numerals represent colors. Items common to all the colors will be described with the symbols Y, M, C, and K omitted. The printer engine 150 may obtain image data from an information processing apparatus such as a not-illustrated personal computer (PC), aside from the image scanner 100.

The printer engine 150 includes primary transfer devices 105Y, 105M, 105O, and 105K and an intermediate transfer belt 104 under the image forming units 101Y, 101M, 101C, and 101K. The primary transfer devices 105Y, 105M, 105C, and 105K transfer toner images formed on respective photosensitive drums 102Y, 102M, 102C, and 102K onto the intermediate transfer belt 104. A multicolor image is thereby formed on the intermediate transfer belt 104. The intermediate transfer belt 104 is an image bearing member that bears an image. The intermediate transfer belt 104 rotates clockwise in the diagram, and conveys the formed toner image (multicolor image) to a secondary transfer portion 106 by rotation. A sheet is conveyed to the secondary transfer portion 106 in synchronization with the timing when the intermediate transfer belt 104 conveys the toner image to the secondary transfer portion 106, Sheets are stored in storage units 110a and 110b in the printer engine 150. The sheets stored in the storage units 110a and 110b are fed by feed rollers one by one. Sheets are also placed on a manual feed tray 50 and fed by a feed roller one by one. The fed sheet is conveyed through a conveyance path to registration rollers 111. The registration rollers 111 correct sheet skew. The registration rollers 111 convey the sheet to the secondary transfer portion 106 in synchronization with the timing when the toner image on the intermediate transfer belt 104 is conveyed to the secondary transfer portion 106. When the toner image on the intermediate transfer belt 104 and the sheet pass the secondary transfer portion 106, the toner image is transferred from the intermediate transfer belt 104 to the sheet. Toner remaining on the intermediate transfer belt 104 after the transfer of the toner image is cleaned by a belt cleaner 108.

The printer engine 150 includes a fixing device 107. The sheet which the toner image is transferred is conveyed from the secondary transfer portion 106 to the fixing device 107. The fixing device 107 includes a plurality of rollers and a heater. The fixing device 107 heats and presses the unfixed toner image transferred to the sheet with the rollers and the heater, whereby the toner image is fixed to the sheet. This completes the image formation on the sheet. The sheet on which the image formation is completed is discharged from the fixing device 107 to outside the printer engine 150 (image forming apparatus 21) by a discharge roller 112.

In two-sided printing, a sheet having an image formed on the first side (front side or one side) thereof is passed through the fixing device 107 and conveyed to a reversing path 113 by a flapper. The conveyance direction of the sheet is reversed by the reversing path 113, and the sheet is conveyed to a two-sided path 114. The conveyance from the reversing path 113 to the two-sided path 114 reverses the sheet. The reversed sheet is conveyed to the registration rollers 111 again via the two-sided path 114, and an image is formed on a second side (back, the other side) different from the first side in a similar manner to the first side. After the image formation on the second side, the sheet is discharged outside the printer engine 150 (image forming apparatus 21) by the discharge roller 112. In such a manner, the image forming apparatus 21 forms output images on a sheet.

<Control Unit 200>

FIG. 2A is a diagram illustrating the hardware configuration of the control unit 200. FIG. 2B is a diagram illustrating the logical configuration of the control unit 200. The control unit 200 is built in the image forming apparatus 21. FIG. 2A is a hardware block diagram of the control unit 200. The control unit 200 includes a CPU 201, a ROM 202, the RAM 203, and the HDD 204, The CPU 201 controls operation of the image forming apparatus 21 by reading computer programs from the ROM 202 and the HDD 204 and executing the computer programs using the RAM 203 as a work area. The HDD 204 is a large capacity storage device that can store (retain) information. A solid state drive (SSD) may be used instead of the HDD 204.

The HDD 204 stores image data obtained from the image reading apparatus 140 and external information processing apparatuses, and various types of setting information input from the operation panel 20. In particular, in the present exemplary embodiment, the HDD 204 stores adjustment conditions for correcting an image forming position. The control unit 200 is connected to and can control the image reading apparatus 140, the printer engine 150, and the operation panel 20.

The present exemplary embodiment deals with functions for correcting the image forming position, and a description of functions for image formation by the image forming apparatus 21 will be omitted. The control unit 200 functions as the image processing unit 210, a position calculation unit 213, a scanner individual information storage unit 214, a sheet management table 500, and a pattern generator 70 by the CPU 201 executing computer programs. The functions of the control unit 200 may be implemented by discrete semiconductor products or a one-chip semiconductor product, instead of being implemented by execution of the computer programs. Examples of the one-chip semiconductor product include a microprocessing unit (MPU), an application specific integrated circuit (ASIC), and a system-on-a-chip (SOC).

The image processing unit 210 includes the position adjustment unit 211, and performs various types of image processing on image data to correct the image data so that a desired image is formed on a sheet. Examples of the image processing that the image processing unit 210 performs include processing for gradation correction and processing for correcting the image forming position. The image data corrected by the image processing unit 210 is transmitted to exposure devices 103 in the printer engine 150. The exposure devices 103 irradiate the photosensitive drums 102 with laser light modulated based on the image data corrected by the image processing unit 210, whereby electrostatic latent images based on the image data are formed on the photosensitive drums 102.

The position adjustment unit 211 corrects the image forming position on the sheet based on the adjustment conditions. The position adjustment unit 211 corrects the image data by a conventional method such that the image forming position on the sheet comes to a target position.

The image forming position of an image formed on a sheet can deviate from an ideal image forming position. For example, if a sheet skewed to the conveyance direction passes the secondary transfer portion 106, a tilted image is formed on the sheet. If pressure is not uniformly distributed on the rollers of the fixing device 107, a sheet is deformed during fixing processing and a tilted image is formed on the sheet. In two-sided printing, a sheet extends or contracts due to the heat and pressure of the fixing device 107 during image formation on the front. This makes the size of the image formed on the back different from that of the image formed on the front (two-sided magnification error). In such a case, the image forming position on the front of the sheet is accordingly different from that on the back.

The skew of the sheet passing through the secondary transfer portion 106 and the amount of deformation of the sheet in the fixing device 107 are highly reproducible if the sheet size, grammage, and material are the same. The image forming apparatus 21 according to the present exemplary embodiment modifies the shape of the image to be formed based on the deformation amount of the sheet so that the image forming position on the sheet comes to an ideal position. The position adjustment unit 211 converts the image data based on the adjustment conditions stored in the sheet management table 500, including conversion formulas for correcting deviations of the image forming position on the sheet. For example, if the magnification in the main scanning direction during image formation on a sheet increases by 1.1 times, the position adjustment unit 11 corrects the image data so that the length of the image to be formed increases by 1/1.1 times in the main scanning direction during image formation. The magnification of the image to be formed is thus 1.0 times in the main scanning direction during image formation. If the coordinates of a predetermined pixel deviate by 0.1 pixel in a predetermined direction, the position adjustment unit 211 corrects the image data to shift the coordinates of the pixel by 0.1 pixel in the opposite direction. As a result, the pixel is formed on an ideal position on the sheet. The image forming units 101 form images based on the image data converted by the position adjustment unit 211. An image in which deviations of the image forming position on the sheet are cancelled out is thereby formed on the intermediate transfer belt 104. The sheet management table 500 stores the amounts of position deviation of the image forming position and adjustment conditions for reducing the amounts of position deviation, generated by the position calculation unit 213, with respect to each sheet type. For example, the sheet management table 500 is formed in the HDD 204.

The position calculation unit 213 measures the amounts of position deviation of the image forming position and generates the adjustment conditions to be described below. For that purpose, the position calculation unit 213 includes a correction condition generation unit 2131 and an adjustment condition generation unit 2132. The position calculation unit 213 measures the amounts of position deviation of the image forming position in either one of adjustment condition generation modes including a manual mode and an automatic mode. The adjustment condition generation mode is selected by using the operation panel 20. The position calculation unit 213 obtains the selection result from the operation panel 20, measures the amounts of position deviation of the image forming position in the adjustment condition generation mode based on the selection result, and generates the adjustment conditions for the amounts of position deviation measured.

The pattern generator 70 transmits measurement image data to the printer engine 150. The measurement image data is image data for forming measurement images to be used in measuring the image formation position. The printer engine 150 generates a measurement chart by forming the measurement images on a sheet based on the measurement image data.

In the manual mode, the user manually measures the positions of the measurement images formed on the measurement chart, and inputs the measurement results into the position calculation unit 213 from the operation panel 20. The position calculation unit 213 measures the amounts of position deviation of the image forming position based on the measurement results input from the operation panel 20, generates the adjustment conditions for the amounts of position deviation, and stores the generated adjustment conditions in the sheet management table 500. In the automatic mode, the image scanner 100 reads the positions of the measurement images formed on the measurement chart, and inputs the read result (read images) to the position calculation unit 213. The position calculation unit 213 measures the positions (coordinate data) of the measurement images from the read images, generates the adjustment conditions, and stores the generated adjustment conditions in the sheet management table 500. In the automatic mode, if the measurement chart is readable by using the ADF 120, the control unit 200 prompts the user to perform an operation in an ADF-reading mode to give higher priority to the ADF-reading mode. If the measurement chart is not readable by using the ADF 120, the control unit 200 prompts the user to perform an operation in a mode in which the measurement chart is set and read on the platen glass 142.

The scanner individual information storage unit 214 stores adjustment conditions generated to reduce measurement errors in the image forming position due to individual differences of the image scanner 100. The position calculation unit 213 generates the adjustment conditions based on the measurement results of the measurement images obtained from the image scanner 100. The position calculation unit 213 reduces measurement errors included in the measurement results due to the individual differences of the image scanner 100 by applying the adjustment conditions to the measurement results of the measurement images obtained from the image scanner 100. The position calculation unit 213 generates the adjustment conditions for the amounts of position deviation of the image forming position based on the measurement results of which the measurement errors are reduced.

<Sheet Management Table>

FIG. 5 is a diagram illustrating an example of the sheet management table 500. Examples of sheets to be managed by the sheet management table 500 include commercially available sheets evaluated by printer vendors and sheets registered from the operation panel 20 by the user. The sheet management table 500 is stored in the HDD 204 in a file format such as Extensible Markup Language (XML) and comma-separated values (CSV). The sheet management table 500 can be read, written, and updated as appropriate.

Attribute data for each sheet type (501 to 508) is registered in the sheet management table 500. The sheet type is identified by a sheet name 511. The attribute data includes physical features of a sheet, such as a width 512, a length 513, a grammage 514, a surface property 515, and a color 516 of the sheet. The attribute data also includes information 517 about whether the sheet is preprinted paper, amounts of position deviation 518 on the front, and amounts of position deviation 519 on the back. The surface property 515 of a sheet refers to the physical property of the sheet surface, such as plain paper, embossed paper, and two-sided coated paper. Coating is typically applied to improve/refine glossiness of the sheet surface. Embossing is processing for forming depressions and protrusions on the sheet surface. The color 516 indicates the color of the sheet. The information 517 about whether the sheet is preprinted paper indicates whether the sheet used for printing is preprinted paper. Examples of preprinted paper include sheets on which rules or grids are printed in advance.

The amounts of position deviation 518 are values quantitatively indicating position deviations from the ideal image forming position on the front of the sheet. The amounts of position deviation 519 are values quantitatively indicating position deviations from the ideal image forming position on the back of the sheet. During image formation, the image forming positions on the sheet are corrected based on the amounts of position deviation 518 and 519, whereby images are formed at the ideal image forming positions on the sheet. The image forming apparatus 21 performs image formation while adjusting the image forming positions to cancel out the amounts of position deviation. In the present exemplary embodiment, the amounts of position deviation 518 and 519 are expressed in terms of a lead position, a side position, a main scanning magnification, and a sub scanning magnification.

The lead position represents the amount of position deviation of the image forming position in the sub scanning direction during image formation on the sheet. The side position represents the amount of position deviation of the image forming position in the main scanning direction during image formation on the sheet. The lead position is the start position of image formation with the leading edge of the sheet in the conveyance direction as the starting point. The initial value of the lead position is "0". The side position is the start position of image formation with the left edge of the sheet seen in the conveyance direction as the starting point. The initial value of the side position is "0". The lead and side positions are adjusted, for example, by controlling the irradiation start timing of the laser light with which the exposure devices 103 irradiate the photosensitive drums 102. The sub scanning magnification represents a deviation of the image length (magnification with respect to an ideal length) in the sub scanning direction during image formation. The sub scanning magnification is adjusted, for example, by controlling the rotation speed of the intermediate transfer belt 104. The main scanning magnification represents a deviation of the image length (magnification with respect to an ideal length) in the main scanning direction during image formation. The main scanning magnification is adjusted, for example, by controlling the clock frequency of the laser light when the exposure devices 103 modulate the laser light based on the image data. The initial values of the sub and main scanning magnifications are "0".

The image forming apparatus 21 can operate in the two adjustment condition generation modes: the manual mode and the automatic mode. In the manual mode, the user measures the measurement chart by using a ruler, and inputs the measurement results from the operation panel 20. The position calculation unit 213 calculates the amounts of position deviation 518 and 519 based on the input measurement results. In the automatic mode, the image scanner 100 reads the measurement chart, and the position calculation unit 213 calculates the amounts of position deviation 518 and 519 based on the positions of the measurement images on the measurement chart. The position calculation unit 213 registers new attribute data or updates previously-registered attribute data in the sheet management table 500 with the amounts of position deviation 518 and 519 as the attribute data of the sheet.

<Measurement Chart>

One of the image qualities during two-sided printing is that the image forming position of an output image on the front and that of an output image on the back are well aligned. A measurement chart to be described below is used in checking the image forming position on the front and the image forming position the back. A measurement chart refers to a sheet on which measurement images for measuring the image forming positions are formed. The image forming positions on the front and the back can be measured by using the measurement chart, or sheet, having the measurement images formed on the both sides of the sheet. The image forming positions on the front and the back can be aligned by correcting the amounts of deviation (amounts of position deviation) of the image forming positions on both sides based on the measurement results of the image forming positions on the front and the back.

FIG. 7 is a diagram illustrating a configuration of the measurement chart. Measurement images 721 to 728 are formed at predetermined positions on a front 702 and a back 703 of the measurement chart or sheet. In the present exemplary embodiment, a total of eight measurement images 721 to 728 are formed at four corners on both sides of the measurement chart. If the measurement images 721 to 728 are formed at ideal positions, the measurement images 721 to 728 are located at positions a predetermined distance from the sheet edges of the measurement chart. In other words, if the measurement images 721 to 728 are formed at deviated positions, the measurement images 721 to 728 are away from the sheet edges of the measurement chart by different distances than the predetermined distance.

The measurement using the foregoing measurement chart is performed either manually or automatically. In the manual mode, the user manually measures the distances from the sheet edges to the measurement images 721 to 728. In the automatic mode, the distances from the sheet edges to the measurement images 721 to 728 are measured by image analysis. The amounts of position deviation 518 and 519 are calculated based on the distances of the measurement images 721 to 728 from the sheet edges.

The measurement images 721 to 728 are desirably formed in a color that has a large difference in reflectance from the sheet color. For example, black measurement images 721 to 728 may be formed on a white sheet. The large difference in reflectance from the sheet color allows high-precision measurement of the distances of the measurement images 721 to 728 from the sheet edges in measuring the position deviations in the automatic mode.

In the case of a long measurement chart using a long-sized sheet, the measurement images 721 and 722 and marks 731, 732, and 710 are formed on the leading edge side of the front of the sheet. The measurement images 723 and 724 and marks 733, 734, and 711 are formed on the trailing edge side of the front of the sheet. The measurement images 725 and 726 and marks 735, 736, and 712 are formed on the leading edge side of the back of the sheet. The measurement images 727 and 728 and marks 737, 738, and 713 are formed on the trailing edge side of the back of the sheet.

Because of the large size, the long measurement chart is difficult to read as a single image by using the image scantier 100. The marks 731, 732, 733, and 734 are therefore arranged on the front of the long measurement chart, and the marks 735, 736, 737, and 738 on the back, to ensure availability for measurement even if the long measurement chart is read as two separate images: a read image on the leading edge side and a read image on the trailing edge side. The marks 731 to 738 are ones for combining the read images on the leading and trailing edge sides. The position calculation unit 213 combines the read images on the leading and trailing edge sides so that the center position between the marks 731 and 732 in the read image on the leading edge side coincides with the center position between the marks 733 and 734 in the read image on the trailing edge side. A read image of the front of the single sheet (measurement chart) is thereby generated. The position calculation unit 213 also combines the read images on the leading and trailing edge sides so that the center position between the marks 735 and 736 in the read image on the leading edge side coincides with the center position between the marks 737 and 738 in the read image on the trailing edge side. A read image of the back of the single sheet (measurement chart) is thereby generated.

The measurement charts includes the marks 710, 711, 712, and 713. The marks 710, 711, 712, and 713 are formed in respectively different colors. For example, the mark 710 is formed in blue, the mark 711 yellow, the mark 712 red, and the mark 713 green. The marks 710, 711, 712, and 713 are used as indexes in inputting or calculating measurement values.

The marks 710, 711, 712, and 713 may be identified by shape instead of color.

The position calculation unit 213 combines the read images on the leading and trailing edge sides of the front of the measurement chart based on the positions of marks 731 to 734 and marks 735 to 738, respectively. As illustrated in FIG. 7, the position calculation unit 213 obtains coordinates Pt01(X01, Y01) to Pt71(X71, Y71) and coordinates Pt02 (X02, Y02) to Pt72(X72, Y72) from the combined read images. A set of coordinates are denoted by Ptij(Xij, Yij), where i is an identification number indicating a position and j is an identification number indicating whether the side is the front (j=1) or the back (j=2). The coordinates Pt01 are those of the top left corner of the front 702 of the measurement chart (in the following description, the leading edge side of the measurement chart will be referred to as the top, and the trailing edge side the bottom. The left and right refer to the left and right directions when the measurement chart is seen with the leading edge side up). The coordinates Pt11 are those of the top right corner of the front 702 of the measurement chart. The coordinates Pt21 are those of the bottom left corner of the front 702 of the measurement chart. The coordinates Pt31 are those of the bottom right corner of the front 702 of the measurement chart. The coordinates Pt41 are those of the top left corner of the measurement image 721 formed on the top left portion of the front 702. The coordinates Pt51 are those of the top right corner of the measurement image 722 formed on the top right portion of the front 702. The coordinates Pt61 are those of the bottom left corner of the measurement image 723 formed on the bottom left portion of the front 702. The coordinates Pt71 are those of the bottom right corner of the measurement image 724 formed on the bottom right portion of the front 702. The coordinates on the back 703 are defined in a similar manner.

In the present exemplary embodiment, the measurement chart of the same format is used regardless of whether the measurement is performed in the manual mode or in the automatic mode. However, for the sake of measurability, different measurement charts may be used based on the adjustment condition generation mode. In such a case, a plurality of pieces of image data expressing different measurement images for the respective adjustment condition generation modes is stored in the pattern generator 70. One of the pieces of image data is transmitted as appropriate from the pattern generator 70 to the printer engine 150 based on the adjustment condition generation mode specified from the operation panel 20.

<Calculation of Amounts of Position Deviation>

FIG. 6 is a diagram illustrating information managed by a calculation table 600. The calculation table 600 is a table for calculating the amounts of position deviation by using pieces of information about the distances from the measurement images 721 to 728 to the sheet edges, read from the measurement chart. The calculation table 600 is stored in the HDD 204. The control unit 200 calculates the amounts of position deviation based on the calculation table 600.

As described in FIG. 5, the amounts of position deviations 518 and 519 are expressed by items on the front and items on the back. The calculation table 600 includes conversion formulas for obtaining the amounts of position deviation 518 and 519 in terms of the items on the front and back. The items expressing the amounts of position deviations 518 and 519 include degrees of squareness in addition to the foregoing lead positions, side positions, main scanning magnifications, and sub scanning magnifications. A degree of squareness is defined by distances D and H (see FIG. 7) from the side connecting the coordinates Pt01 and Pt11 of the sheet to the measurement images 721 and 722 and a sheet length A (see FIG. 7) in the main scanning direction during image reading. The values A to J' used in the conversion formulas of the items represent the measurements of the distances of the measurement images 721 to 728 from the sheet edges illustrated in FIG. 7. Adjustment conditions are generated to cancel out the amounts of position deviation calculated by the conversion formulas. In other words, the amounts of positional deviation are parameters for defining the conversion formulas that are an example of the adjustment conditions. In a broader sense, the amounts of position deviation themselves are adjustment conditions.

<User Operation>

FIG. 8A is a diagram illustrating a sheet management table editing screen 800. The sheet management table editing screen 800 is a screen displayed on the operation panel 20 when an instruction to edit the sheet management table 500 is given by the user. A sheet list 811 lists existing registered sheets and main setting values. The entire list is displayed by scrolling bar 812 up and down. A new entry button 820 is a button to be pressed when the user registers a new sheet. After the pressing of the new entry button 820, a sheet registration screen is displayed. An edit button 821 is a button to be pressed when the user edits the setting values of a registered sheet. After the pressing of the edit button 821, an edit screen for the sheet selected on the sheet list 811 is displayed. A delete button 822 is a button to be pressed when the user deletes a registered sheet. After the pressing of the delete button 822, a screen for confirming whether to delete the sheet selected on the sheet list 811 is displayed. A print position adjustment button 823 is a button to be pressed when the user performs a print position adjustment on a registered sheet. If a sheet is selected from the sheet list 811 and then the print position adjustment button 823 is selected, a selection screen illustrated in FIG. 8B is displayed on the operation panel 20.

FIG. 8B is a diagram illustrating a selection screen 850 for selecting a chart reading method. The selection screen 850 includes a button 851 and a button 852. To use the manual mode, the user selects the button 851. To use the automatic mode, the user selects the button 852. If either one of the buttons 851 and 852 is selected, the printer engine 150 starts to form a measurement chart corresponding to the sheet selected on the sheet list 811. The sheet to be used to form the measurement chart is previously set in a sheet feed unit such as the manual feed tray 50. A print position adjustment is then performed, the amounts of deviation in the print position are measured, and adjustment values are displayed in print position adjustment values 813 on the sheet list 811.

<Manual Mode>

FIG. 9 is a diagram illustrating an input screen for inputting measurement results. An input screen 900 is a screen displayed on the operation panel 20 when the manual mode is set. The input screen 900 includes pieces of guide information for indicating the portions to be measured in the measurement chart, input boxes for inputting measurement results, and a setting completion button 901 for completing the setting. In this example, the user measures parameters C to J on both the front 702 and the back 703 of the measurement chart, and inputs the measurement results into the corresponding input boxes by using the operation panel 20. If the user finishes the input to the input boxes and selects the setting completion button 901, processing for calculating the amounts of position deviation is started.

The position calculation unit 213 calculates the amounts of position deviation of the image forming positions by using the conversion formulas illustrated in the calculation table 600 of FIG. 6 based on the measurement results input from the input screen 900. The position calculation unit 213 calculates the amounts of position deviation in terms of "lead positions", "side positions", "main scanning magnifications", "sub scanning magnifications", and "degrees of squareness" on both sides of the measurement chart by substituting the measurement results into the conversion formulas registered in the calculation table 600. The position calculation unit 213 registers the calculated amounts of position deviation of the respective items in the amounts of position deviation 518 and 519 of the sheet management table 500 as the attribute data on the sheet.

On the input screen 900, the input boxes for the parameters C, D, E, and F of the front are highlighted in blue. The input boxes for the parameters G, H, I, and J of the front are highlighted in yellow. The input boxes for the parameters C, D, E, and F of the back are highlighted in red. The input boxes for the parameters G, H, I, and J of the back are highlighted in green. Such colors correspond to those of the marks 710, 711, 712, and 713. The input to the input boxes is prompted in order of the colors of the marks 710, 711, 712, and 713. This can prevent redundant input of measurement values.

<Automatic Mode (Platen)>

An automatic mode (platen) is a mode executed if a sheet suited to platen reading is selected on the sheet management table editing screen 800 and the automatic mode is specified on the selection screen 850. Examples of the sheet suited to the platen reading include a sheet that is difficult to convey by the ADF 120. Examples of the sheet difficult to convey by the ADF 120 include a sheet having a short side longer than the width of the ADF 120 and a sheet having a thickness greater than or equal to a predetermined value. The maximum width size of a sheet conveyable by the ADF 120 is typically the same as the width size of a printable sheet. A measurement chart having a maximum width size that does not allow a sheet to be conveyed by the ADF 120 therefore will not be printed. It may be basically determined whether a sheet is difficult to convey by the ADF 120 based only on whether the sheet has a thickness greater than or equal to a predetermined value.

In the automatic mode (platen), the leading edge side and the trailing edge side of the measurement chart are read in two separate operations. The reading may desirably be performed with a pressing plate not lowered but opened. The reason is that the sheet edges of the measurement chart on the platen can thereby be emphasized to facilitate detecting the sheet edges of the measurement chart during edge detection by the position calculation unit 213. To emphasize the sheet edges, a black pressing plate may be used to press the measurement chart against the platen, In reading the leading edge side of the measurement chart, for example, the measurement chart is placed on the platen with the trailing edge side of the measurement chart protruded toward the near side in FIG. 1. In reading the trailing edge side of the measurement chart, the measurement chart is rotated 180° from the state in which the leading edge side is read and placed on the platen with the already-read leading edge side protruded toward the near side in FIG. 1. The orientation of the measurement chart during reading does not affect the calculation of the adjustment values. The control unit 200 automatically determines in which direction the measurement images are with respect to the main and sub scanning directions based on the layout and shape of the read measurement chart. In reading the leading edge side of the measurement chart, the measurement chart may therefore be placed on the platen with the trailing edge side of the measurement chart protruded toward the right in FIG. 1. In reading the trailing edge side of the measurement chart, the measurement chart may be placed on the platen with the leading edge side of the measurement chart protruded toward the right in FIG. 1.

In the automatic mode (platen), the amounts of position deviation are measured from the read images of the measurement chart read by the image scanner 100. Individual differences of the image scanner 100 can thus contribute to errors in the read images. In calculating the amounts of position deviation, a correction for reducing reading errors based on individual difference information about the image scanner 100 may be applied.

<Operation Screen in Automatic Mode (Platen)>

Figure 10:
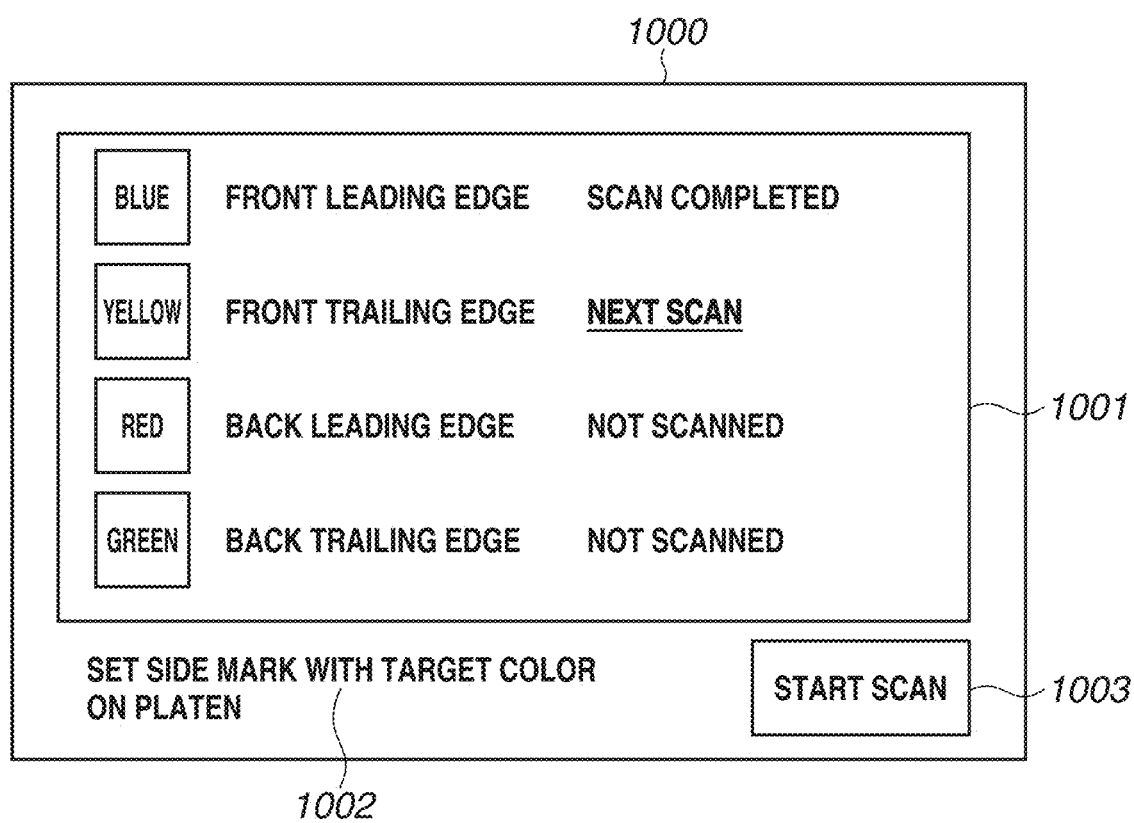
FIG. 10 is a diagram illustrating an operation screen in an automatic mode (platen).

FIG. 10 is a diagram illustrating an operation screen in the automatic mode (platen). An operation screen 1000 is a screen displayed when a sheet suited to platen reading is selected on the sheet management table editing screen 800 and the automatic mode is specified on the selection screen 850. The operation screen 1000 includes progress information 1001, a message 1002, and a button 1003.

The progress information 1001 includes a group of pieces of information indicating the progress of platen reading. The progress information 1001 includes a name "front leading edge" in association with blue, a name "front trailing edge" in association with yellow, a name "back leading edge" in association with red, and a name "back tailing edge" in association with green. Such colors correspond to those of the marks 710, 711, 712, and 713. Status information "scan completed", "next scan", and "not scanned" is arranged in association with the names. "Scan completed" indicates that the reading position in question has already been scanned. "Next scan" indicates that the reading position is to be scanned next. "Not scanned" indicates that the reading position is not scanned yet. A message 1002 is a message for prompting the user to set the measurement chart to be read. A button 1003 is a button used to start scanning the measurement chart set on the platen.

The operation screen 1000 prompts scanning in order of the colors of the marks 710, 711, 712, and 713. This can prevent the occurrence of redundant document reading. While the present exemplary embodiment employs the method of specifying the starting order of scanning, such a method does not necessarily need to be employed. For example, the color of the mark in the read image may be identified upon reading, and the status corresponding to the color may be changed from "not scanned" to "scan completed". Such a method can also prevent the occurrence of redundant document reading.

<Operation Flow in Automatic Mode (Platen)>

Next, detailed operations in the automatic mode (platen) will be described. In a first reading operation, the image scanner 100 reads the leading edge side of the front of the measurement chart while moving the scanner unit 40 from the home position P1 to the end position P2. The control unit 200 here reserves an area for recording image data on the leading edge side of the front of the measurement chart in the RAM 203. Suppose that the image scanner 100 scans an A3-size measurement area (7015×9920 pixels) of the platen at a resolution of 600 dpi to obtain image data having a depth of 8 bits for each of red, green, and blue (RGB). In such a case, the size of the area to be reserved in the RAM 203 may desirably be at least approximately 1.6 Gbits. Image data written to the image memory 329 in the image reading apparatus 140 is sequentially stored into the area reserved in the RAM 203 in the control unit 200 via the controller interface image communication line 353 including the image transfer clock signal line. The control unit 200 measures the stored image data by using the CPU 201, in a second reading operation, the image scanner 100 reads the trailing edge side of the front of the measurement chart while moving the scanner unit 40 from the home position P1 to the end position P2. The control unit 200 measures the stored image data by using the CPU 201. In a third reading operation, the image scanner 100 reads the leading edge side of the back of the measurement chart while moving the scanner unit 40 from the home position P1 to the end position P2. The control unit 200 measures the stored image data by using the CPU 201. In a fourth reading operation, the image scanner 100 reads the trailing edge side of the back of the measurement chart while moving the scanner unit 40 from the home position P1 to the end position P2. The control unit 200 measures the stored image data by using the CPU 201. The measurement images on both sides of the measurement chart are read by such four reading operations.

<Automatic Mode (ADF)>

An automatic mode (ADF) is a mode executed if a sheet suited to ADF reading is selected on the sheet management table editing screen 800 and the automatic mode is specified on the selection screen 850. Examples of the sheet suited to ADF reading include a sheet conveyable by the ADF 120. Examples of the sheet conveyable by the ADF 120 include a sheet having a short side not longer than the width of the ADF 120 and a thickness less than a predetermined value.

To accurately read the measurement chart in performing an automatic adjustment using the ADF 120, scanning may desirably be performed without stopping sheet conveyance. In such a case, the image data on both sides of a long measurement chart is stored into the image memory 329 on the image reading apparatus 140, the RAM 203 that is the storage device on the control unit 200, or the HDD 204. For example, suppose that the long sheet has a size of 297 mm×1300 mm, the reading resolution is 600 dpi, and the image data has a depth of 8 bits for each of RGB colors. To store such image data on both sides without compression, a memory size of 9.6 Gbits (1.2 Gbytes) may be desirable. Configuring a built-in unit to secure an area as large as 1.2 Gbytes in the RAM 203 at a time is costly and impractical, if not impossible.

In a method, the image data may be once saved to the HDD 204 that is a large-capacity storage device, and only the image data on the sheet edge portions may be read into the RAM 203 afterward. However, most large-capacity storage devices like an HDD have low writing speed, and can fail to keep up with the reading speed of the long measurement chart on the ADF 120. In other words, an overrun can occur because the read image data fails to be saved.

In the present exemplary embodiment, in view of the foregoing issue, the occurrence of image data overrun is prevented by sequentially discarding data on intermediate portions of the long measurement chart during ADF reading of the long measurement chart. More specifically, the control unit 200 performs control to implement states 1 to 6 illustrated in FIG. 16.

Figure 16:
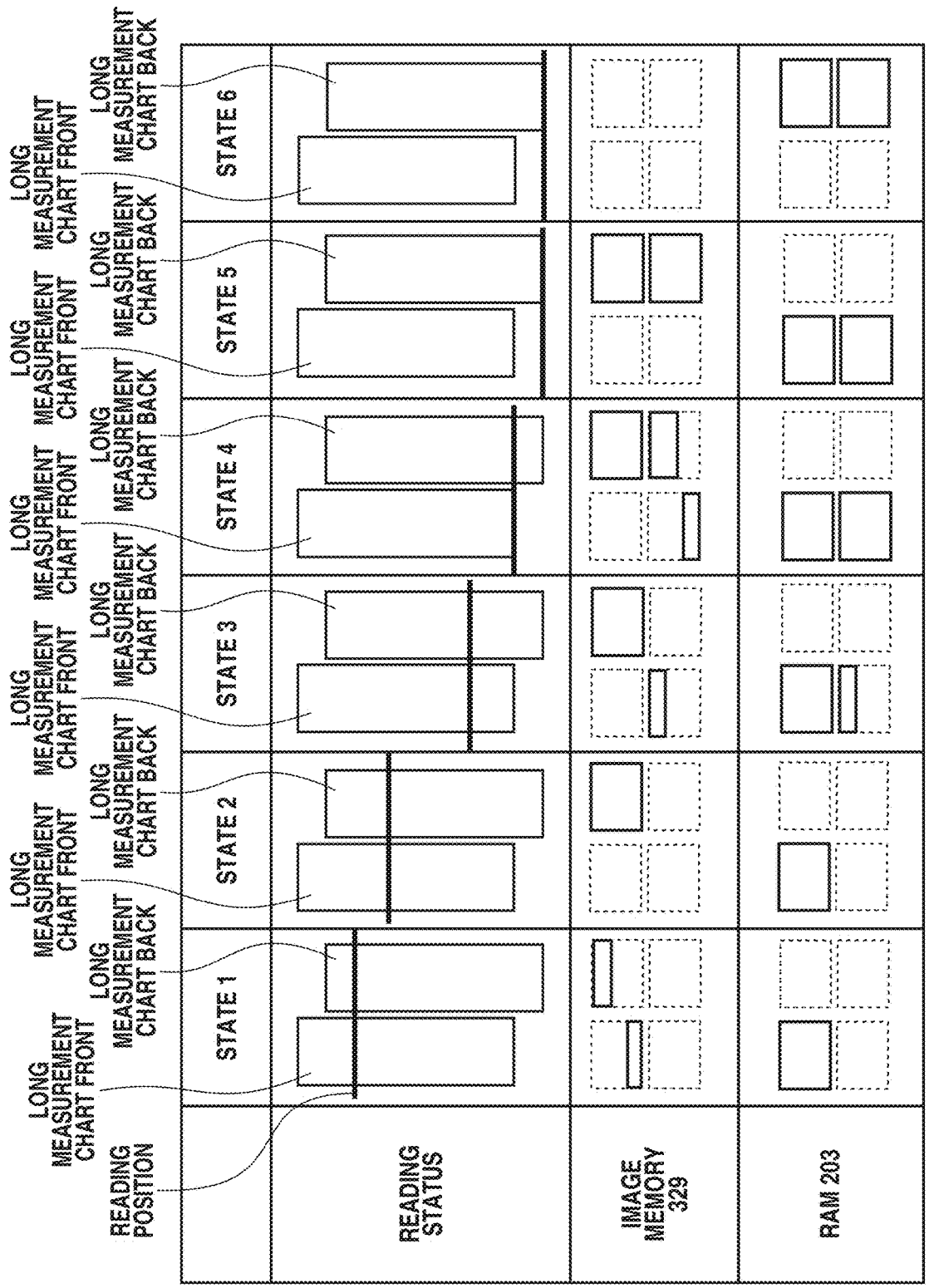
FIG. 16 is a diagram illustrating state transitions in the long measurement chart ADF reading processing.

FIG. 16 is a diagram illustrating state transitions in long measurement chart ADF reading processing. The row "reading status" in FIG. 16 illustrates a positional relationship between the front of the long measurement chart and the scanner unit 40 and a positional relationship between the back of the long measurement chart and the CIS 9 in each of states 1 to 6. A difference in reading timing due to a difference between the installation positions of the scanner unit 40 and the CIS 9 is expressed by the different vertical positions of the front and the back of the long measurement chart. In FIG. 16, the row "image memory 329" illustrates a storage status of data in the image memory 329 in each of states 1 to 6. In FIG. 16, the row "RAM 203" illustrates a storage status of data in the RAM 203 in each of states 1 to 6.

State 1 is a state where the image reading in the leading edge region of the front is completed. Since the image data on the leading edge region of the front is sequentially transmitted from the image memory 329 to the RAM 203, only part of the data under transfer is left in the image memory 329. All of the image data on the leading edge region of the front is stored in the RAM 203. Since the image data on the leading edge region of the back is not sequentially transferred, all of the read image data is stored in the image memory 329.

State 2 is a state where the image reading in the leading edge region of the hack is completed. The image data on the intermediate region of the front is discarded immediately after reading. All the image data on the leading edge region of the back is stored in the image memory 329.

State 3 is a state where the image reading in the trailing edge region of the front is started. The image data on the trailing edge region of the front is under transfer, and is stored in both the image memory 329 and the RAM 203. The image data on the intermediate region of the back is discarded immediately after reading.

State 4 is a state where the image reading in the trailing edge region of the front is completed. Only part of the image data on the trailing edge region of the front which is under transfer is left in the image memory 329. All of the image data on the leading edge region of the front and all of the image data on the trailing edge region of the front are stored in the RAM 203. All of the image data on the leading edge region of the back and the image data on part of the trailing edge region of the hack are stored in the image memory 329.

In state 5, all of the image data on the leading edge region of the front and all of the image data on the trailing edge region of the front are stored in the RAM 203. All of the image data on the leading edge region of the back and all of the image data on the trailing edge region of the back are stored in the image memory 329.

State 5 is a state where the image reading in the trailing edge region of the back is completed.

State 6 is a state where a memory transfer of the image data on the back is completed. When generation of front correction data is completed, all of the image data on the leading edge region of the front and all of the image data on the trailing edge region of the front are deleted from the RAM 203. The image data on the back is transferred from the image memory 329 to the RAM 203. The image memory 329 is empty, and the RAM 203 stores all of the image data on the leading edge region of the back and all of the image data on the trailing edge region of the back. When generation of back correction data is then completed, all of the image data on the leading edge region of the back and all of the image data on the trailing edge region of the back are deleted from the RAM 203.

In the present exemplary embodiment, the image data is handled to achieve the foregoing states. More specifically, the image data on the front is transferred from the image memory 329 to the RAM 203 by a plurality of times of transfers. The image data on the back is transferred to the RAM 203 after the processing of the image data on the front is finished. The image data on the intermediate regions is discarded immediately after reading. By executing such processing, images used to calculate adjustment values using the long measurement chart can be obtained even if the image memory 329 has a small memory capacity (memory capacity not greatly exceeding the total data size of the leading and trailing edge regions of the front).

<Operation Screen in Automatic Mode (ADF)>

Figure 11:
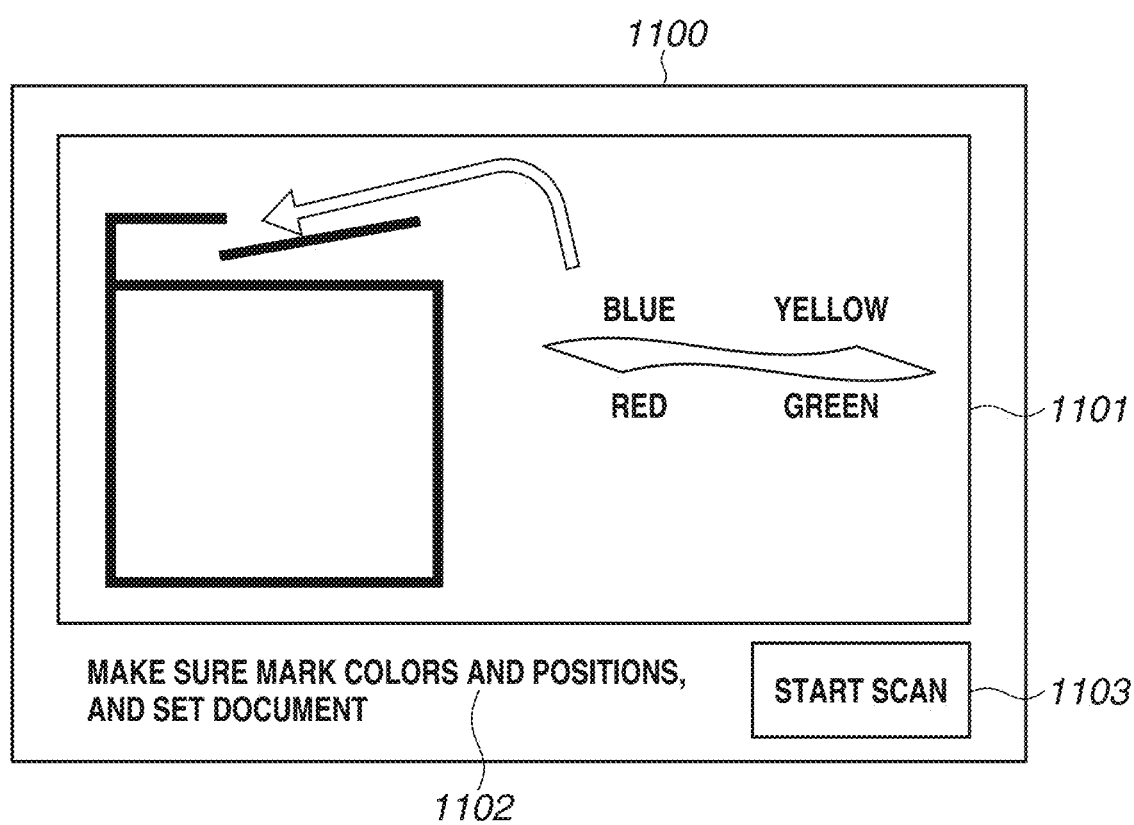
FIG. 11 is a diagram illustrating an operation screen in an automatic mode (automatic document feeder (ADF)).

FIG. 11 is a diagram illustrating an operation screen in the automatic mode (ADF). An operation screen 1100 is a screen displayed if a sheet suited to ADF reading is selected on the sheet management table editing screen 800 and the automatic mode is specified on the selection screen 850. The operation screen 1100 includes guide information 1101, a message 1102, and a button 1103.

The guide information 1101 is information illustrating a method for starting the ADF reading. The guide information 1101 includes illustrations of the image forming apparatus 21 and the long measurement chart, and indication marks. The illustration of the image forming apparatus 21 depicts the orientation of the ADF 120, from which the setting position of the measurement chart can be figured out. The illustration of the long measurement chart is associated with labels "blue", "yellow", "red", and "green", which correspond to the colors of the marks 710, 711, 712, and 713. The user can thus figure out the leading and trailing edges and the front and back of the long measurement chart in setting the long measurement chart on the ADF 120.

The message 1102 is a message for prompting the user to set the measurement chart to be read. The button 1103 is a button used to start scanning the measurement chart set on the platen.

As described above, if the measurement chart is read by the ADF 120, the operation panel 20 displays how to set the measurement chart on the ADF 120 by using the colors of the marks 710, 711, 712, and 713. This can prevent the measurement chart from being set in an erroneous way. While the present exemplary embodiment employs the method of specifying the setting orientation of the long measurement chart, such a method does not necessarily need to be employed. For example, the color of the mark in the read image may be identified upon image reading to determine whether the read image is that of the leading edge side of the front, the trailing edge side of the front, the leading edge side of the back, or the trailing edge side of the back. Adjustment values may be generated by taking into account the determination result.

<Reading Processing>

Figure 13:
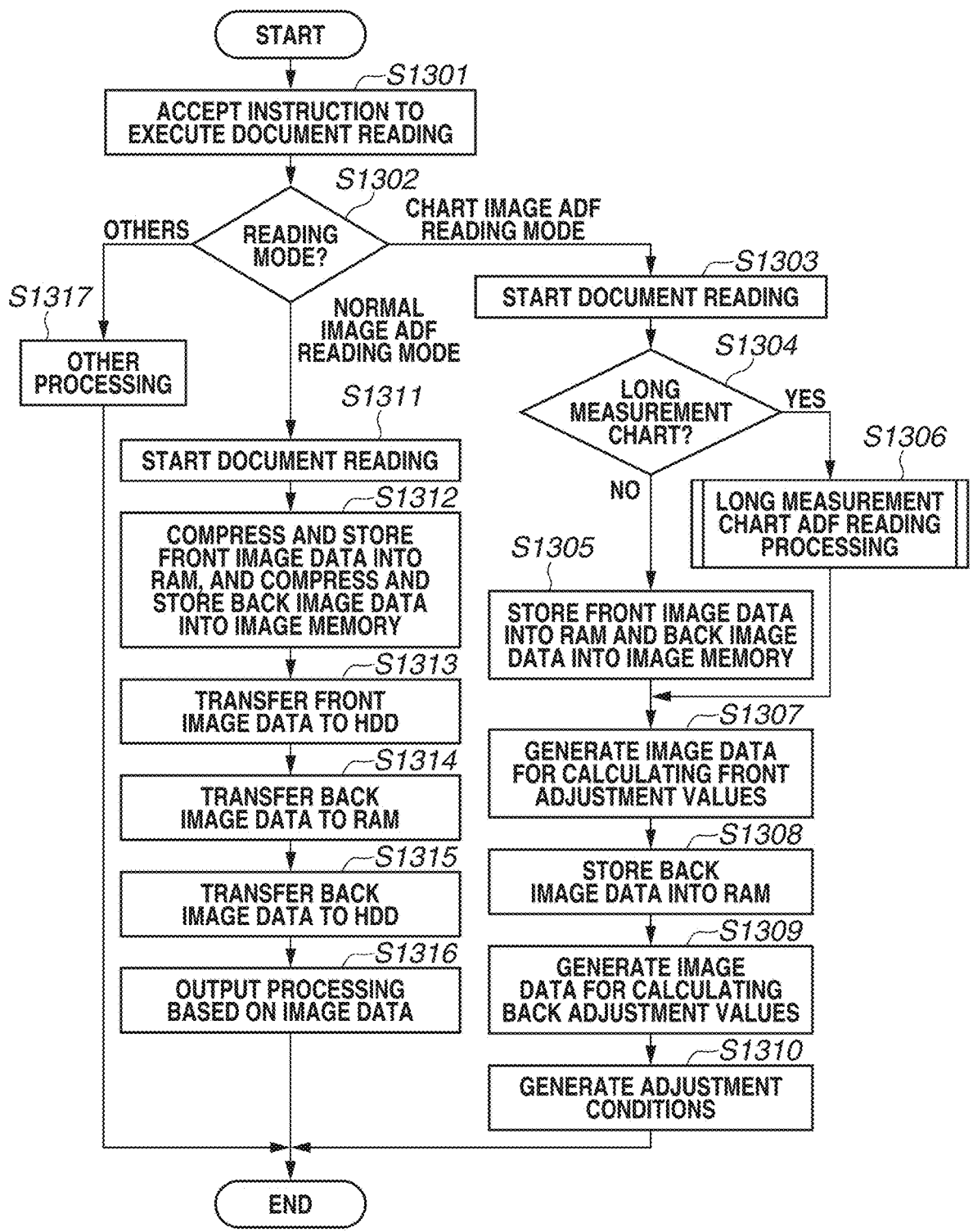
FIG. 13 is a flowchart illustrating a processing procedure related to document reading processing.

The processing for reading the measurement chart in the automatic mode (ADF) is one of several types of reading processing executable by the image forming apparatus 21. FIG. 13 is a flowchart illustrating a processing procedure related to document reading processing. This procedure is implemented in the control unit 200 by loading a program stored in the ROM 202 into the RAM 203 and executing the program by the CPU 201.

In step S1301, the control unit 200 accepts an instruction to execute document reading from the user via the operation panel 20. In step S1302, the control unit 200 determines which type of reading instruction is accepted based on information about the screen displayed on the operation panel 20 when the instruction is accepted. Possible reading modes include a normal image platen reading mode, a normal image ADF reading mode, a chart image platen reading mode, and a chart image ADF reading mode.

If the instructed reading mode is the normal image ADF reading mode (NORMAL IMAGE ADF READING MODE in step S1302), the processing proceeds to step S1311. If the instructed reading mode is the chart image ADF reading mode (CHART IMAGE ADF READING MODE in step S1302), the processing proceeds to step S1303. If the instructed reading mode is other than the foregoing reading modes (OTHERS in step S1302), the processing proceeds to step S1317. In step S1317, the control unit 200 performs other processing. The present processing is ended.

In step S1311, the control unit 200 controls the image scanner 100 to start document reading for normal image ADF reading. In step S1312, the control unit 200 compresses the read front image data, stores the compressed front image data into the RAM 203, compresses the read back image data, and stores the compressed back image data into an intermediate buffer (image memory 329). In step S1313, the control unit 200 transfers the compressed front image data to the HDD 204 to secure free space in the RAM 203. In steps S1314 and S1315, the control unit 200 transfers the back image data stored in the image memory 329 to the HDD 204 via the RAM 203. In step S1316, the control unit 200 performs output processing based on the image data stored in the HDD 204. If the output processing is print processing, the image data is transferred to the printer engine 150. If the output processing is transmission processing (such as FAX transmission and e-mail transmission), the image data is transferred to a FAX interface (not illustrated) or network interface (not illustrated). In the normal image ADF reading mode, a sufficient storage area even for a long document can be secured by compressing the read images.

In step S1303, the control unit 200 controls the image scanner 100 to start document reading for chart image ADF reading.

In step S1304, in the chart image ADF reading, the control unit 200 obtains sheet information about the sheet selected on the sheet management table editing screen 800, and determines whether the measurement chart to be read is a long measurement chart. In other words, the control unit 200 determines whether the measurement chart to be read is one having such a size that the entire image data is unable to be recorded without compression.

If the measurement chart to be read is a long measurement chart (YES in step S1304), the processing proceeds to step S1306 for special memory control. If the measurement chart to be read is a long measurement chart, a sufficient storage area for simple reading is difficult to secure. In step S1306, the control unit 200 therefore performs special processing for reading the long measurement chart by using the ADF 120. After the completion of the processing of step S1306, the processing proceeds to step S1307.

If the measurement chart to be read is not a long measurement chart (NO in step S1304), the processing proceeds to step S1305 for normal memory control. If the measurement chart to be read is not a long measurement chart, a sufficient storage area can be secured, in step S1305, the control unit 200 stores the front image data in the RAM 203 and stores the back image data in the image memory 329. The processing proceeds to step S1307.

In step S1307, the control unit 200 generates image data for calculating front adjustment values from the front image data stored in the RAM 203. In step S1308, the control unit 200 obtains the back image data stored in the image memory 329 and stores the back image data into the RAM 203. In step S1309, the control unit 200 generates image data for calculating back adjustment values from the back image data stored in the RAM 203. If the reading of the measurement chart is completed, then in step S1310, the control unit 200 calculates position deviation adjustment values and generates adjustment conditions based on the obtained image data for calculation. Details of the processing for calculating reading errors and generating adjustment conditions are described above. Specifically, the control unit 200 obtains the read images of the entire measurement chart, and the position calculation unit 213 calculates the position deviation adjustment values. If the measurement chart to be read is a long measurement chart, the control unit 200 generates the image data for calculating the adjustment values by combining the read images of the leading and trailing edge sides of each of the front and back.

<Relationship Between Scan Count Values and Reading Positions>

Figure 12:
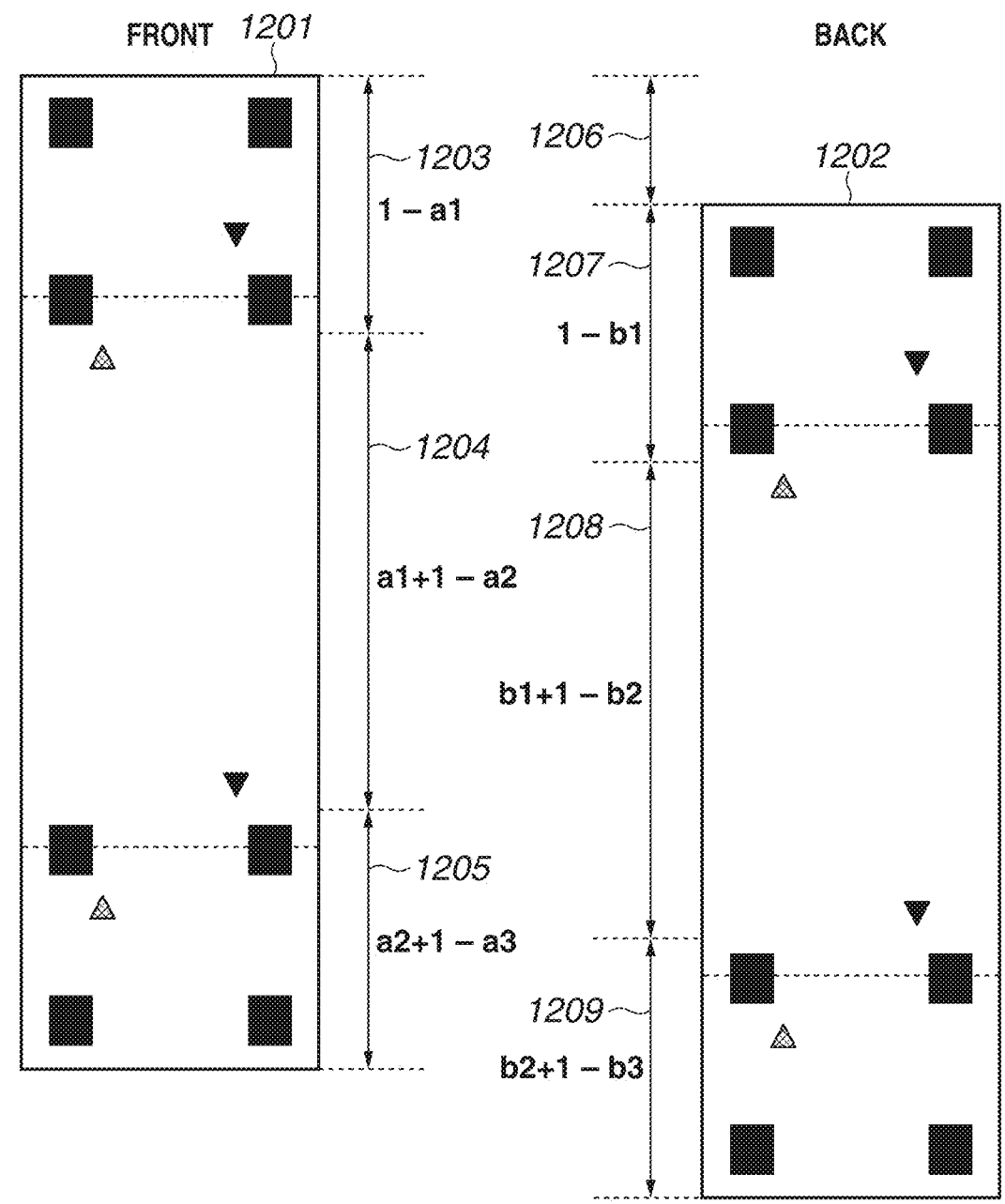
FIG. 12 is a diagram illustrating a relationship between a long measurement chart and reading positions.

In the present exemplary embodiment, the long measurement chart is conveyed by the ADF 120, and uncompressed images used for adjustment processing are obtained without stopping conveyance. For that purpose, in the present exemplary embodiment, processing for storing the image data on the leading and trailing edge regions of the long measurement chart and discarding the image data on the intermediate regions is performed. In the present exemplary embodiment, scan count values (count results) of the scanner unit 40 and the CIS 9 are used to determine the regions of the long measurement chart. The scan count values are counted by a counter unit 215 serving as a count unit. A scan count value is a value indicating how many times a line area extending along the direction of orientation of the scanner unit 40 or the CIS 9 is read. FIG. 12 illustrates a relationship between the scan count values and the reading positions. FIG. 12 is a diagram illustrating a relationship between the long measurement chart and reading positions.

As illustrated in FIG. 12, the front of the long measurement chart includes a leading edge region 1203, an intermediate region 1204, and a trailing edge region 1205. The back of the long measurement chart includes a leading edge region 1207, an intermediate region 1208, and a trailing edge region 1209. An offset 1206 represents a timing difference between when the leading edge of the front of the long measurement chart is read by the scanner unit 40 and when the leading edge of the back of the long measurement chart is read by the CIS 9.

The scan count value of the scanner unit 40 will be denoted by "a". The leading edge region 1203 of the front can be expressed as "1 to a1", the intermediate region 1204 as "a1+1 to a2", and the trailing edge region 1205 as "a2+1 to a3". "a1" is a scan count value corresponding to the end position of the leading edge region 1203 of the front. "a2" is a scan count value corresponding to the end position of the intermediate region 1204 of the front. "a3" is a scan count value corresponding to the end position of the trailing edge region 1205 of the back.

The scan count value for the CIS 9 will be denoted by "b". The leading edge region 1207 of the back can be expressed as "1 to b1", the intermediate region 1208 as "b1+1 to b2", and the trailing edge region 1209 of the back as "b2+1 to b3". "b1" is a scan count value corresponding to the end position of the leading edge region 1207 of the back. "b2" is a scan count value corresponding to the end position of the intermediate region 1208 of the back, "b3" is a scan count value corresponding to the end position of the trailing edge region 1209 of the back.

<Control Flow in Automatic Mode (ADF)>

Figure 14:
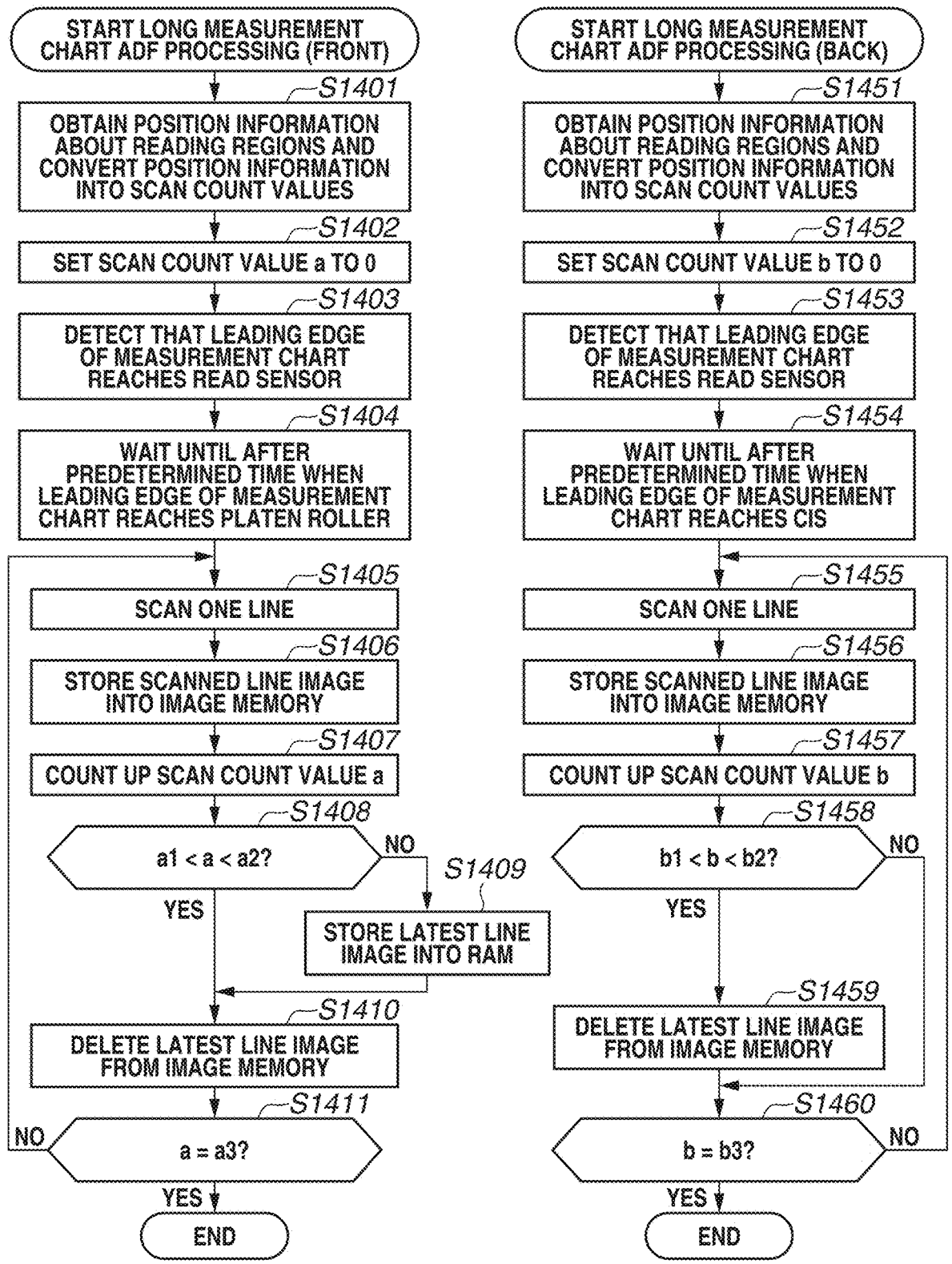
FIG. 14 is a flowchart illustrating a procedure of long measurement chart ADF reading processing.

Details of the long measurement chart ADF reading processing will be described. FIG. 14 is a flowchart illustrating a procedure of the long measurement chart ADF reading processing. As illustrated in FIG. 14, the long measurement chart ADF reading processing includes processing on the front and processing on the hack that are performed in parallel. This procedure is implemented in the control unit 200 by loading programs stored in the ROM 202 into the RAM 203 and executing the programs by the CPU 201.

If the long measurement chart ADF reading processing is started in step S1306, the processing proceeds to step S1401. In step S1401, the control unit 200 obtains position information about the leading edge region 1203 of the front, position information about the intermediate region 1204 of the front, and position information about the trailing edge region 1205 of the front based on size information about the sheet selected on the sheet management table editing screen 800. The control unit 200 performs conversion processing for expressing the position information in terms of scan count values.

In step S1402, the control unit 200 sets the scan count value "a" to 0. In step S1403, the control unit 200 detects that the leading edge of the measurement chart reaches the read sensor 14. In step S1404, the control unit 200 waits until after a predetermined time (timing Ta0) when the leading edge of the measurement chart reaches the platen roller 5. In step S1405, after a lapse of the predetermined time, the control unit 200 causes the CCD sensor unit 148 to start scanning. The CCD sensor unit 148 scans a line. In step S1406, the control unit 200 stores the scanned line image in the image memory 329. In step S1407, the counter unit 215 counts up (+1) the scan count value "a". In step S1408, the control unit 200 determines whether the current scan count value satisfies the relationship of "a1<a<a2". If the current scan count value satisfies the relationship of "a1<a<a2" (YES in step S1408), the processing proceeds to step S1410. If the current scan count value does not satisfy the relationship of "a1<a<a2" (NO in step S1408), the processing proceeds to step S1409. In step S1409, the control unit 200 obtains the latest line image stored in the image memory 329 based on the scan count value, and stores the latest line image into the RAM 203. In step S1410, the control unit 200 deletes the latest line image stored in the image memory 329 in step S1406.

In step S1411, the control unit 200 determines whether the current scan count value satisfies the relationship of "a=a3". If the current scan count value does not satisfy the relationship of "a=a3" (NO in step S1411), the processing returns to step S1405. If the current scan count value satisfies the relationship of "a=a3" (YES in step S1411), the processing is ended.

If the long measurement chart ADF reading processing is started in step S1306, the processing proceeds to step S1451. In step S1451, the control unit 200 obtains position information about the leading edge region 1207 of the back, position information about the intermediate region 1208 of the back, and position information about the trailing edge region 1209 of the back based on the size information about the sheet selected on the sheet management table editing screen 800. The control unit 200 performs conversion processing for expressing the position information in terms of scan count values.

In step S1452, the control unit 200 sets the scan count value "b" to 0. In step S1453, the control unit 200 detects that the leading edge of the measurement chart reaches the read sensor 14. In step S1454, the control unit 200 waits until after a predetermined time (timing Tb0) when the leading edge of the measurement chart reaches the CIS 9. In step S1455, after a lapse of the predetermined time, the control unit 200 causes the CIS 9 to start scanning. The CIS 9 scans a line. In step S1456, the control unit 200 stores the scanned line image in the image memory 329. In step S1457, the counter unit 215 counts up (+1) the scan count value "b", in step S1458, the control unit 200 determines whether the current scan count value satisfies the relationship of "b1<b<b2". If the current scan count value satisfies the relationship of "b1<b<b2" (YES in step S1458), the processing proceeds to step S1459. If the current scan count value does not satisfy the relationship of "b1<b<b2" (NO in step S1458), the processing proceeds to step S1460. In step S1459, the control unit 200 deletes the latest line image stored in the image memory 329.

In step S1460, the control unit 200 determines whether the current scan count value satisfies the relationship of "b=b3". If the current scan count value does not satisfy the relationship of "b=b3" (NO in step S1460), the processing returns to step S1455. If the current scan count value satisfies the relationship of "b=b3" (YES in step S1460), the processing is ended.

Then, in steps S1307 to S1310, the control unit 200 generates the pieces of image data for calculating the adjustment values by combining the image data on the leading edge region of the front and the image data on the trailing edge region of the front and by combining the image data on the leading edge region of the back and the image data on the trailing edge region of the back. The adjustment values are calculated from the respective pieces of image data for calculation, and stored in association with the sheet information.

A second exemplary embodiment will be described. In the first exemplary embodiment, the regions to delete an image and the regions not to delete an image among the regions of the long measurement chart are determined by using the scan count values. In a second exemplary embodiment, such determinations are made by using time count values, not the scan count values. In the second exemplary embodiment, since the scan count values are not used, useless scans do not need to be performed in the intermediate region of the long measurement chart. A power saving effect can thus be expected from turning off the scanner unit 40 in the intermediate region. An image forming apparatus 21 according to the second exemplary embodiment has a similar configuration to that of the first exemplary embodiment except characteristic portions. Similar components are therefore designated by the same reference numerals, and a detailed description thereof will be omitted.

<Relationship Between Time Count Values and Reading Positions>

Figure 17:
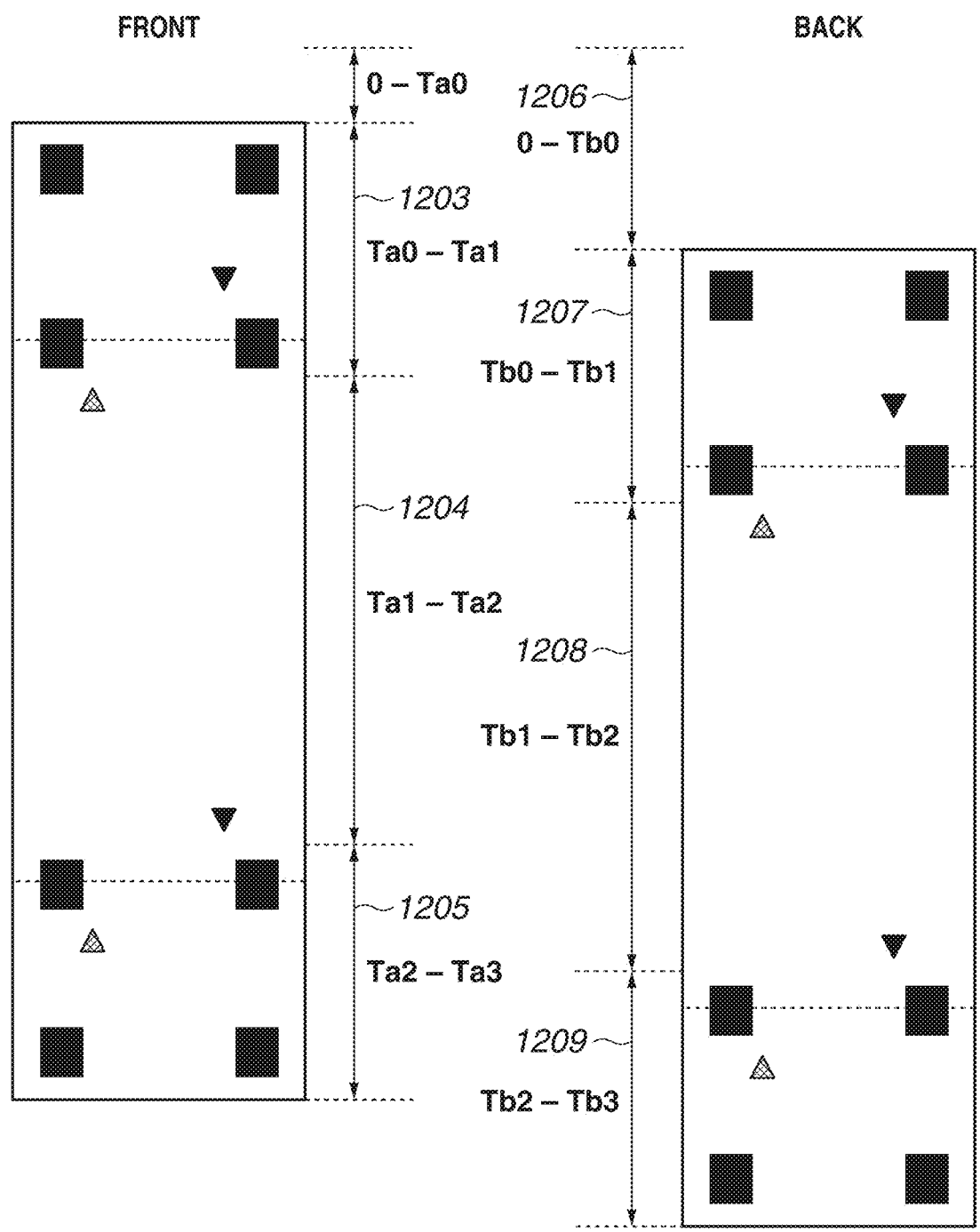
FIG. 17 is a diagram illustrating a relationship between a long measurement chart and ADF reading according to a second exemplary embodiment.

In the present exemplary embodiment, a long measurement chart is conveyed by the ADF 120, and uncompressed images used for adjustment processing are obtained without stopping conveyance. For that purpose, in the present exemplary embodiment, processing for activating the CCD sensor unit 148 and the scanner unit 40 in the leading and trailing edge regions of the long measurement chart and deactivating the CCD sensor unit 148 and the scanner unit 40 in the intermediate region is performed. In the present exemplary embodiment, time count values counted by the counter unit 215 are used to determine the regions of the Tong measurement chart. A time count value is a value indicating the time elapsed since the arrival of the leading edge of the long measurement chart at the read sensor 14. FIG. 17 illustrates a relationship between the time count values and the reading positions. FIG. 17 is a diagram illustrating a relationship between the long measurement chart and the ADF reading according to the second exemplary embodiment.

The time count value for the scantier unit 40 will be denoted by "Ta". A period from when the leading edge of the long measurement chart reaches the read sensor 14 to when the leading edge reaches the platen roller 5 can be expressed as "0 to Ta0". A period where the leading edge region 1203 of the front passes the platen roller 5 can be expressed as "Ta0 to Ta1". A period where the intermediate region 1204 passes the platen roller 5 can be expressed as "Ta1 to Ta2". A period where the trailing edge region 1205 passes the platen roller 5 can be expressed as "Ta2 to Ta3". "Ta1" represents the timing when the end position of the leading edge region 1203 of the front passes the platen roller 5, "Ta2" represents the timing when the end position of the intermediate region 1204 of the front passes the platen roller 5. "Ta3" represents the timing when the end position of the trailing edge region 1205 of the front passes the platen roller 5.

The time count value for the CIS 9 will be denoted by "Tb". A period where the leading edge region 1207 of the back passes the CIS 9 can be expressed as "Tb0 to Tb1". A period where the intermediate region 1208 passes the CIS 9 can be expressed as "Tb1 to Tb2". A period where the trailing edge region 1209 passes the CIS 9 can be expressed as "Tb2 to Tb3". "Tb1" represents the timing when the end position of the leading edge region 1207 of the back passes the CIS 9. "Tb2" represents the timing when the end position of the intermediate region 1208 of the back passes the CIS 9. "Tb3" represents the timing when the end position of the trailing edge region 1209 of the back passes the CIS 9.

<Control Flow in Automatic Mode (ADF)>

Details of long measurement chart ADF reading processing will be described. FIG. 18 is a flowchart illustrating a procedure of the long measurement chart ADF reading processing according to the second exemplary embodiment. As illustrated in FIG. 18, the long measurement chart ADF reading processing includes processing on the front and processing on the hack that are performed in parallel. This procedure is implemented in the control unit 200 by loading programs stored in the ROM 202 into the RAM 203 and executing the programs by the CPU 201.

If the long measurement chart ADF reading processing is started in step S1306, the processing proceeds to step S1801. In step S1801, the control unit 200 obtains position information about the leading edge region 1203 of the front, position information about the intermediate region 1204 of the front, and position information about the trailing edge region 1205 of the front based on size information about the sheet selected on the sheet management table editing screen 800. The control unit 200 performs conversion processing for expressing the position information in terms of time count values.

In step S1802, the control unit 200 sets the time count value "Ta" to 0. In step S1803, the control unit 200 detects that the leading edge of the measurement chart reaches the read sensor 14. In step S1804, the control unit 200 waits until after a predetermined time (timing Ta0) when the leading edge of the measurement chart reaches the platen roller 5. In step S1805, after a lapse of the predetermined time, the control unit 200 causes the CCD sensor unit 148 to start scanning. The CCD sensor unit 148 scans a line. In step S1806, the control unit 200 stores the scanned line image into the image memory 329. In step S1807, the control unit 200 determines whether the current time count value satisfies the relationship of "Ta1<Ta<Ta2".

In step S1807, if the current time count value satisfies the relationship of "Ta1<Ta<Ta2" (YES in step S1807), the processing proceeds to step S1808. In step S1808, the control unit 200 deactivates the CCD sensor unit 148 and the scanner unit 40. In step S1809, the control unit 200 waits while the relationship of "Ta1<Ta<Ta2" is satisfied (YES in step S1809). If the relationship of "Ta1<Ta<Ta2" is no longer satisfied (NO in step S1809), the processing proceeds to step S1810. In step S1810, the control unit 200 activates the CCD sensor unit 148 and the scanner unit 40. The processing proceeds to step S1812.

In step S1807, if the current time count value does not satisfy the relationship of "Ta1<Ta<Ta2" (NO in step S1807), the processing proceeds to step S1811. In step S1811, the control unit 200 obtains the latest line image stored in the image memory 329, and stores the latest line image into the RAM 203. The processing proceeds to step S1812. In step S1812, the control unit 200 deletes the latest line image stored in the image memory 329 in step S1806. The processing proceeds to step S1813.

In step S1813, the control unit 200 determines whether the current time count value satisfies the relationship of "Ta≥Ta3". If the current time count value does not satisfy the relationship of "Ta≥Ta3" (NO in step S1813), the processing returns to step S1805. If the current time count value satisfies the relationship of "Ta≥Ta3" (YES in step S1813), the processing is ended.

If the long measurement chart ADF reading processing is started in step S1306, the processing proceeds to step S1851. In step S1851, the control unit 200 obtains position information about the leading edge region 1207 of the back, position information about the intermediate region 1208 of the back, and position information about the trailing edge region 1209 of the back based on the size information about the sheet selected on the sheet management table editing screen 800. The control unit 200 performs conversion processing for expressing the position information in terms of time count values.

In step S1852, the control unit 200 sets the time count value "Tb" to 0. In step S1853, the control unit 200 detects that the leading edge of the measurement chart reaches the read sensor 14. In step S1854, the control unit 200 waits until after a predetermined time (timing Tb0) when the leading edge of the measurement chart reaches the CIS 9. In step S1855, after a lapse of the predetermined time, the control unit 200 causes the CIS 9 to start scanning. The CIS 9 scans a line. In step S1856, the control unit 200 stores the scanned line image into the image memory 329. In step S1857, the control unit 200 determines whether the current time count value satisfies the relationship of "Tb1<Tb<Tb2".

In step S1857, if the current time count value satisfies the relationship of "Tb1<Tb<Tb2" (YES in step S1857), the processing proceeds to step S1858, in step S1858, the control unit 200 deactivates the CIS 9. In step S1859, the control unit 200 waits while the relationship of "Tb1<Tb<Tb2" is satisfied (YES in step S1859). If the relationship of "Tb1<Tb<Tb2" is no longer satisfied (NO in step S1859), the processing proceeds to step S1860. In step S1860, the control unit 200 activates the CIS 9. The processing proceeds to step S1861.

In step S1857, if the current time count value does not satisfies the relationship of "Th1<Tb<Tb2" (NO in step S1857), the processing proceeds to step S1861.

In step S1861, the control unit 200 determines whether the current time count value satisfies the relationship of "Tb≥Tb3". If the current time count value does not satisfy the relationship of "Tb≥Tb3" (NO in step S1861), the processing returns to step S1855. If the current time count value satisfies the relationship of "Tb≥Tb3" (YES in step S1861), the processing is ended.

Then, in steps S1307 to S1310, the control unit 200 generates the pieces of image data for calculating the adjustment values by combining the image data on the leading edge region of the front and the image data on the trailing edge region of the front and by combining the image data on the leading edge region of the back and the image data on the trailing edge region of the hack. The adjustment values are calculated from the respective pieces of image data for calculation, and stored in association with the sheet information.

(Other Exemplary Embodiments)

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-225479, filed Nov. 30, 2018, which is hereby incorporated by reference herein in its entirety.

What is claimed is:

1. An image reading apparatus configured to read a sheet being conveyed, the image reading apparatus comprising:
 a reading device configured to read one side of the sheet in units of a line area orthogonal to a conveyance direction of the sheet;
 one or more controllers configured to perform operations including:
 storing, into a memory, a read image of a first region of a leading edge side of the sheet in the conveyance direction, and a read image of a third region subsequent to a second region subsequent to the first region and of a trailing edge side of the sheet in the conveyance direction, and
 performing predetermined processing based on the read image of the first region and the read image of the third region stored in the memory, wherein a read image of the second region is not stored in the memory.

2. The image reading apparatus according to claim 1, wherein the predetermined processing is processing for outputting position deviation information about the sheet.

3. The image reading apparatus according to claim 2, further comprising a printing device configured to print an image of a sheet,
wherein the one or more controllers perform further operations including causing the printing device to print the image of the sheet based on image data and the position deviation information about the sheet.

4. The image reading apparatus according to claim 1, wherein the image reading apparatus includes a first unit and a second unit including the memory, where the first unit includes the reading device and a buffer memory configured to store a read image, and the read image of the first region and the read image of the third region among read images are transferred from the buffer memory to the memory.

5. The image reading apparatus according to claim 4, wherein the read image of the second region stored in the buffer memory is not transferred to the memory but is deleted from the buffer memory.

6. The image reading apparatus according to claim 4, wherein the read image of the first region is transferred from the buffer memory to the memory by a first plurality of times of separate transfers, and the read image of the third region is transferred from the buffer memory to the memory by a third plurality of times of separate transfers.

7. The image reading apparatus according to claim 4, wherein the read image of the first region and the read image of the third region are stored in the memory as a single piece of image data.

8. The image reading apparatus according to claim 1, further comprising another reading device configured to read the other side of the sheet in the units of the line area orthogonal to the conveyance direction of the sheet,
wherein the one or more controllers perform further operations including:
storing, into the memory, a read image of a fourth region of the leading edge side of the sheet in the conveyance direction, and a read image of a sixth region subsequent to a fifth region subsequent to the fourth region and of the trailing edge side of the sheet in the conveyance direction, wherein a read image of the fifth region is not stored in the memory, and wherein each read image of the fourth, fifth, and sixth region is an image read by the another reading device, and
performing predetermined processing based on the read image of the fourth region and the read image of the sixth region stored in the memory.

9. The image reading apparatus according to claim 1, wherein the one or more controllers perform further operations including:
counting, as a counting result, each time the reading device performs reading in units of the line area, and determining whether to transfer a read image to the memory based on the counting result.

10. The image reading apparatus according to claim 1, wherein the sheet is a long sheet.

11. The image reading apparatus according to claim 1, wherein a chart image is printed on the sheet.

12. The image reading apparatus according to claim 11, further comprising a printing device configured to print the chart image on the sheet.

13. The image reading apparatus according to claim 1, wherein the one or more controllers perform further operations including setting a mode among a plurality of modes including a first reading mode in which the read image of the second region among read images read by the reading device is not stored into the memory, and a second reading mode in which the read images of all the regions among the read images read by the reading device are stored into the memory.

14. The image reading apparatus according to claim 13, wherein, in the first reading mode, the read images are not compressed before the read images are stored into the memory and, in the second reading mode, the read images are compressed before the read images are stored into the memory.

15. The image reading apparatus according to claim 13, wherein the one or more controllers perform further operations including:
counting, as a count result, an elapsed time during conveyance of the sheet, and
determining whether to activate or deactivate the reading device based on the count result.

16. A method for an image reading apparatus configured to read a sheet being conveyed and including a reading device configured to read one side of the sheet in units of a line area orthogonal to a conveyance direction of the sheet, the method comprising:
storing, into a memory, a read image of a first region of a leading edge side of the sheet in the conveyance direction, and a read image of a third region subsequent to a second region subsequent to the first region and of a trailing edge side of the sheet in the conveyance direction; and
performing predetermined processing based on the read image of the first region and the read image of the third region stored in the memory,
wherein a read image of the second region is not stored in the memory.

17. A non-transitory storage medium storing a program to cause a computer to execute a method for an image reading apparatus configured to read a sheet being conveyed and including a reading device configured to read one side of the sheet in units of a line area orthogonal to a conveyance direction of the sheet, the method comprising:
storing, into a memory, a read image of a first region of a leading edge side of the sheet in the conveyance direction, and a read image of a third region subsequent to a second region subsequent to the first region and of a trailing edge side of the sheet in the conveyance direction; and
performing predetermined processing based on the read image of the first region and the read image of the third region stored in the memory,
wherein a read image of the second region is not stored in the memory.

* * * * *